United States Patent
Mazur

[19]

[11] Patent Number: 6,039,645
[45] Date of Patent: *Mar. 21, 2000

[54] SOFTWARE LOADING SYSTEM FOR A COIN SORTER

[75] Inventor: Richard A. Mazur, Naperville, Ill.

[73] Assignee: Cummins-Allison Corp., Mt. Prospect, Ill.

[*] Notice: This patent is subject to a terminal disclaimer.

[21] Appl. No.: 08/881,420

[22] Filed: Jun. 24, 1997

[51] Int. Cl.[7] .................................................. G07D 3/00
[52] U.S. Cl. .......................................................... 453/10
[58] Field of Search ..................................... 453/3, 6, 10

[56] References Cited

U.S. PATENT DOCUMENTS

| | | | |
|---|---|---|---|
| D. 369,984 | 5/1996 | Larsen | D10/97 |
| 2,669,998 | 2/1954 | Buchholz . | |
| 2,750,949 | 6/1956 | Kulo et al. . | |
| 2,835,260 | 5/1958 | Buchholz . | |
| 3,246,295 | 4/1966 | DeClaris et al. | 382/56 |
| 3,280,974 | 10/1966 | Riddle et al. | 209/111.8 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |
| 3,618,765 | 11/1971 | Cooper et al. | 209/122 |
| 3,679,314 | 7/1972 | Mustert | 356/71 |
| 3,715,031 | 2/1973 | Okkonen | 209/75 |
| 3,764,899 | 10/1973 | Peterson | 324/61 R |
| 3,778,628 | 12/1973 | Novak et al. | 250/556 |
| 3,800,078 | 3/1974 | Cochran et al. | 178/7.1 |
| 3,806,710 | 4/1974 | Shigemori et al. | 235/92 |
| 3,815,021 | 6/1974 | Kerr | 324/61 R |
| 3,842,281 | 10/1974 | Goodrich | 250/461 |
| 3,870,629 | 3/1975 | Carter et al. | 209/111.8 |
| 3,906,449 | 9/1975 | Marchak | 340/149 R |
| 3,976,198 | 8/1976 | Carnes et al. | 209/111.7 T |
| 4,041,456 | 8/1977 | Ott et al. | 340/146.3 R |
| 4,096,991 | 6/1978 | Iguchi | 235/419 |
| 4,114,804 | 9/1978 | Jones et al. | 235/476 |

(List continued on next page.)

FOREIGN PATENT DOCUMENTS

| | | |
|---|---|---|
| 0 077 464 | 4/1983 | European Pat. Off. . |
| 0 101 115 | 2/1984 | European Pat. Off. . |
| 0 109 743 | 5/1984 | European Pat. Off. . |
| 0 325 364 | 7/1989 | European Pat. Off. . |

(List continued on next page.)

OTHER PUBLICATIONS

"Toshiba Fitness Sorter CF–400 Series", estimated 1989 or earlier, 6 pages.

Mosler Inc. brochure "The Mosler/Toshiba CF–420", 1989.

JetScan Currency Scanner/Counter, Model 4060, Operator's Manual by Cummins–Allison (Aug. 1991).

(List continued on next page.)

*Primary Examiner*—F. J. Bartuska
*Attorney, Agent, or Firm*—Arnold White & Durkee

[57] ABSTRACT

An apparatus and method for loading software changes into a processor-based coin sorting machine. In one embodiment, a flash card having a memory remotely programmed with a second software code is adapted to be removably electrically coupled to the system controller of the coin sorting machine. Insertion of the flash card causes the initial code in the resident memory of the machine to become erased and replaced with the second software code. The flash card may thereafter be removed from the machine and used to load software changes into other machines. In an alternative embodiment, the flash card may remain electrically coupled to the coin sorting machine. In this embodiment, insertion of the flash card causes the machine to execute the second software code, but the initial code is not erased or replaced. Upon removal of the flash card, the machine does not retain the second software code but will revert to execution of the initial code. In either embodiment, remote programming of the flash card with the second software code may be achieved by electrically coupling the flash card to a first coin sorting machine having a resident memory containing the second software code, causing the second software code to be copied from the resident memory of the first coin sorting machine to the flash card memory.

12 Claims, 14 Drawing Sheets

U.S. PATENT DOCUMENTS

| | | | |
|---|---|---|---|
| 4,147,430 | 4/1979 | Gorgone et al. | 356/51 |
| 4,179,685 | 12/1979 | O'Maley | 340/146.3 H |
| 4,250,806 | 2/1981 | Boyson et al. | 101/2 |
| 4,255,651 | 3/1981 | Phillips | 235/92 |
| 4,277,774 | 7/1981 | Fujii et al. | 340/146.3 |
| 4,283,708 | 8/1981 | Lee | 340/146.3 Z |
| 4,288,781 | 9/1981 | Sellner et al. | 340/146.3 Q |
| 4,302,781 | 11/1981 | Ikeda et al. | 358/486 |
| 4,310,885 | 1/1982 | Azcua et al. | 364/405 |
| 4,311,914 | 1/1982 | Huber | 250/556 |
| 4,313,598 | 2/1982 | DiBlasio | 271/124 |
| 4,334,619 | 6/1982 | Horino et al. | 209/551 |
| 4,337,864 | 7/1982 | McLean | 209/534 |
| 4,348,656 | 9/1982 | Gorgone et al. | 340/146.3 R |
| 4,349,111 | 9/1982 | Shah et al. | 209/534 |
| 4,355,300 | 10/1982 | Weber | 340/146.3 C |
| 4,355,369 | 10/1982 | Garvin | 364/900 |
| 4,356,473 | 10/1982 | Freudenthal | 340/146.3 H |
| 4,360,034 | 11/1982 | Davila et al. | |
| 4,365,700 | 12/1982 | Arimato et al. | |
| 4,381,447 | 4/1983 | Horvath et al. | 250/223 |
| 4,386,432 | 5/1983 | Nakamura et al. | |
| 4,396,902 | 8/1983 | Warthan et al. | 382/64 |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,480,177 | 10/1984 | Allen | 235/379 |
| 4,487,306 | 12/1984 | Nao et al. | 194/4 |
| 4,490,846 | 12/1984 | Ishida et al. | 382/7 |
| 4,513,439 | 4/1985 | Gorgone et al. | 382/7 |
| 4,539,702 | 9/1985 | Oka | 382/7 |
| 4,542,829 | 9/1985 | Emery et al. | 209/534 |
| 4,543,969 | 10/1985 | Rasmussen | |
| 4,544,266 | 10/1985 | Antes | 356/71 |
| 4,547,896 | 10/1985 | Ohtombe et al. | 382/7 |
| 4,553,222 | 11/1985 | Kurland et al. | 364/900 |
| 4,556,140 | 12/1985 | Okada et al. | 194/4 |
| 4,558,224 | 12/1985 | Gober | 250/460.1 |
| 4,559,451 | 12/1985 | Curl | 250/560 |
| 4,563,771 | 1/1986 | Gorgone et al. | 382/7 |
| 4,567,370 | 1/1986 | Falls | 250/461.1 |
| 4,587,412 | 5/1986 | Apisdorf | 235/449 |
| 4,587,434 | 5/1986 | Roes et al. | 250/556 |
| 4,592,090 | 5/1986 | Curl et al. | 382/7 |
| 4,593,184 | 6/1986 | Bryce | 235/449 |
| 4,594,664 | 6/1986 | Hashimoto | 364/405 |
| 4,611,345 | 9/1986 | Ohnishi et al. | 382/7 |
| 4,617,458 | 10/1986 | Bryce | 235/449 |
| 4,628,194 | 12/1986 | Dobbins et al. | 235/379 |
| 4,645,936 | 2/1987 | Gorgone | 250/556 |
| 4,653,647 | 3/1987 | Hashimoto | |
| 4,658,289 | 4/1987 | Nagano et al. | 358/75 |
| 4,677,682 | 6/1987 | Miyagawa et al. | 382/7 |
| 4,678,072 | 7/1987 | Kobayashi et al. | 194/206 |
| 4,681,229 | 7/1987 | Uesaka et al. | 209/534 |
| 4,700,368 | 10/1987 | Munn et al. | 377/8 |
| 4,716,456 | 12/1987 | Hosaka | 358/75 |
| 4,733,308 | 3/1988 | Nakamura et al. | 358/496 |
| 4,743,974 | 5/1988 | Lockwood | 358/285 |
| 4,747,492 | 5/1988 | Saito et al. | 209/534 |
| 4,764,976 | 8/1988 | Kallin et al. | 382/65 |
| 4,782,328 | 11/1988 | Denlinger | 340/365 |
| 4,784,274 | 11/1988 | Mori et al. | 209/534 |
| 4,789,345 | 12/1988 | Carter | 439/71 |
| 4,806,709 | 2/1989 | Evans | 178/19 |
| 4,811,004 | 3/1989 | Person et al. | 340/712 |
| 4,821,332 | 4/1989 | Durham | 382/7 |
| 4,823,393 | 4/1989 | Kawakami | 382/7 |
| 4,827,531 | 5/1989 | Milford | 382/7 |
| 4,837,842 | 6/1989 | Holt | 382/26 |
| 4,842,358 | 6/1989 | Kammoto et al. | 358/75 |
| 4,851,616 | 7/1989 | Wales et al. | 178/18 |
| 4,877,230 | 10/1989 | Winkler et al. | 271/3 |
| 4,880,096 | 11/1989 | Kobayashi | 194/206 |
| 4,881,268 | 11/1989 | Uchida et al. | 382/7 |
| 4,883,181 | 11/1989 | Yoshikawa | 209/534 |
| 4,888,812 | 12/1989 | Dinan et al. | 382/7 |
| 4,903,953 | 2/1990 | Winkler et al. | 271/4 |
| 4,908,516 | 3/1990 | West | 250/556 |
| 4,928,094 | 5/1990 | Smith | 340/712 |
| 4,931,782 | 6/1990 | Jackson | 340/706 |
| 4,970,655 | 11/1990 | Winn et al. | 364/479 |
| 4,973,841 | 11/1990 | Lee | 250/556 |
| 4,992,860 | 2/1991 | Hamaguchi et al. | 358/75 |
| 4,996,604 | 2/1991 | Ogawa et al. | 358/486 |
| 5,020,787 | 6/1991 | Arikawa | 271/3 |
| 5,027,415 | 6/1991 | Hara et al. | 382/7 |
| 5,047,871 | 9/1991 | Meyer et al. | 358/486 |
| 5,054,621 | 10/1991 | Murphy et al. | 209/534 |
| 5,063,599 | 11/1991 | Concannon et al. | 382/7 |
| 5,066,992 | 11/1991 | Wu et al. | 357/23.5 |
| 5,068,519 | 11/1991 | Bryce | |
| 5,114,381 | 5/1992 | Ueda et al. | 453/57 |
| 5,122,754 | 6/1992 | Gotaas | 324/676 |
| 5,134,663 | 7/1992 | Kozlowski | 382/7 |
| 5,146,512 | 9/1992 | Weideman et al. | 382/30 |
| 5,151,607 | 9/1992 | Crane | 250/556 |
| 5,163,672 | 11/1992 | Mennie | 271/187 |
| 5,163,868 | 11/1992 | Adams et al. | 453/11 |
| 5,167,313 | 12/1992 | Dobbin et al. | 194/317 |
| 5,172,907 | 12/1992 | Kalisiak | 271/227 |
| 5,184,115 | 2/1993 | Black et al. | 340/708 |
| 5,184,709 | 2/1993 | Nishiumi et al. | 194/318 |
| 5,198,976 | 3/1993 | Form et al. | 364/410 |
| 5,199,543 | 4/1993 | Kamagami et al. | 194/207 |
| 5,201,395 | 4/1993 | Takezawa et al. | 194/206 |
| 5,207,788 | 5/1993 | Geib et al. | 271/122 |
| 5,220,395 | 6/1993 | Yamashita et al. | 355/313 |
| 5,231,381 | 7/1993 | Duwaer | 340/712 |
| 5,236,072 | 8/1993 | Cargill | 194/207 |
| 5,239,593 | 8/1993 | Wittner et al. | 382/14 |
| 5,240,116 | 8/1993 | Stevens et al. | 209/534 |
| 5,256,080 | 10/1993 | Bright | 439/347 |
| 5,261,518 | 11/1993 | Bryce | 194/206 |
| 5,293,424 | 3/1994 | Holtey et al. | 235/380 X |
| 5,295,196 | 3/1994 | Raterman et al. | 382/135 |
| 5,297,030 | 3/1994 | Vassigh et al. | 364/405 |
| 5,304,813 | 4/1994 | DeMan | |
| 5,308,992 | 5/1994 | Crane et al. | 250/556 |
| 5,317,140 | 5/1994 | Dunthorn | 250/221 |
| 5,335,292 | 8/1994 | Lovelady et al. | 382/17 |
| 5,341,408 | 8/1994 | Melcher et al. | 377/8 |
| 5,342,213 | 8/1994 | Kobayashi | 439/268 |
| 5,363,949 | 11/1994 | Matsubayashi | 194/206 |
| 5,367,577 | 11/1994 | Gotaas | 382/7 |
| 5,381,019 | 1/1995 | Sato | 250/556 |
| 5,397,003 | 3/1995 | Stevens et al. | 209/534 |
| 5,430,664 | 7/1995 | Cargill et al. | 364/550 |
| 5,437,357 | 8/1995 | Ota et al. | 194/206 |
| 5,444,793 | 8/1995 | Kelland | 382/138 |
| 5,454,727 | 10/1995 | Hsu | 439/263 |
| 5,457,336 | 10/1995 | Fang et al. | 257/322 |
| 5,465,301 | 11/1995 | Jotcham et al. | 380/54 |
| 5,465,821 | 11/1995 | Akioka | 194/207 |
| 5,467,405 | 11/1995 | Raterman et al. | 382/13 |
| 5,467,406 | 11/1995 | Graves et al. | 382/135 |
| 5,478,992 | 12/1995 | Hamada et al. | 235/379 |
| 5,493,534 | 2/1996 | Mok | 365/226 |
| 5,507,379 | 4/1996 | Mazur et al. | 453/10 X |
| 5,542,468 | 8/1996 | Lin | 165/80.3 |
| 5,564,974 | 10/1996 | Mazur et al. | 453/10 |

| | | | |
|---|---|---|---|
| 5,602,413 | 2/1997 | Mitchum, Jr. | 209/580 |
| 5,602,933 | 2/1997 | Blackwell et al. | 382/116 |
| 5,602,936 | 2/1997 | Green et al. | 382/140 |
| 5,603,056 | 2/1997 | Totani | 395/828 |
| 5,603,413 | 2/1997 | Mitchum | 209/588 X |
| 5,608,643 | 3/1997 | Wichter et al. | 364/479.14 |
| 5,615,120 | 3/1997 | Schwartz et al. | 364/464.17 |
| 5,633,949 | 5/1997 | Graves et al. | 382/135 |
| 5,640,463 | 6/1997 | Csulits | 382/135 |
| 5,652,802 | 7/1997 | Graves et al. | 382/135 |
| 5,715,169 | 2/1998 | Noguchi | 364/474.07 |

FOREIGN PATENT DOCUMENTS

| | | |
|---|---|---|
| 0 338 123 | 10/1989 | European Pat. Off. . |
| 0 342 647 | 11/1989 | European Pat. Off. . |
| 0 690 451 | 1/1996 | European Pat. Off. . |
| 0 700 098 | 3/1996 | European Pat. Off. . |
| 4 310 216 | 9/1994 | Germany . |
| 2 190 996 | 12/1987 | United Kingdom . |
| 2 204 166 | 11/1988 | United Kingdom . |
| 2 217 086 | 10/1989 | United Kingdom . |
| 2 272 762 | 11/1993 | United Kingdom . |
| 2 270 904 | 3/1994 | United Kingdom . |
| WO 90/07165 | 6/1990 | WIPO . |
| WO 91/11778 | 8/1991 | WIPO . |
| WO 92/17394 | 10/1992 | WIPO . |
| WO 93/23824 | 11/1993 | WIPO . |
| WO 95/24691 | 3/1995 | WIPO . |
| WO 96/10800 | 9/1995 | WIPO . |

OTHER PUBLICATIONS

Sale of Jet Scan Currency Scanner/Counter, Model 4060 (Aug. 1991).

JetScan Currency Scanner/Counter, Model 4061, Operating Instructions by Cummins–Allison Corp. (Apr. 20, 1993).

Sale of JetScan Currency Scanner/Counter, Model 4061 (Apr. 20, 1993).

JetScan Currency Scanner/Counter, Model 4062, Operating Instructions by Cummins–Allison Corp. (Nov. 28, 1994).

Sale of JetScan Currency Scanner/Counter, Model 4062 (Nov. 28, 1994).

Brochure "DeLaRue Systems, The processing of money and documents;" date: copyr. 1987 (See eg., 3120 Currency Sorting Machine, p.3).

Brochure by Toyocom, "New Currency Counter with Denomination Recognition, Toyocom NS" (Sep. 26, 1994)(1 page).

Currency System Int'l , Mr. W. Kranister in Conversation with Richard Haycock; dated: estimated 1994; pp. 1–5.

Currency Systems International, CPS 1200; copyr. 1992; 4 pages.

Currency Systems International, Medium Speed Currency Sorting Family, CPS 600 and CPS 900; date: copy. 1994; 4 pages.

Currency Systems International/Currency Processing Systems, CPS 300; date: copyr. 1992; 4 pages.

Despcription of Currency Systems International's CPS 600 and CPS 900 devices; date: estimated 1994.

Description of Toshiba–Mosler CF–420 Device; estimated 1989.

Glory GFB–200/210/220/230, Desk–Top Bank Note Counter; date: estimated before Aug. 9, 1994.

Glory GSA–500 Sortmaster brochure; date: Jan. 14, 1994; 2 pages.

Glory GSA–500 Sortmaster brochure; dated estimated 1994; 4 pages.

Glory Instruction Manual for GFR–100 Currency Reader Counter (Aug. 15, 1995).

Glory UF–ID brochure; date: estimated before Aug. 9, 1994; 2 pages.

Toshiba–Mosler Operators Manual for CF–420 Cash Settlement System; copyr. 1989 (See e.g., pp. 3–10; 4–10 and 5–7); pp. 1 to C–3.

Toyocom Currency Counter, Model Ns–100, "Operation Guide (Preliminary)" (Jun. 13, 1995).

6,039,645

SOFTWARE LOADING SYSTEM FOR A COIN SORTER

FIELD OF THE INVENTION

The present invention relates generally to coin sorting machines for sorting coins of mixed denominations. More particularly, the present invention relates to a system for quickly and efficiently loading software or software upgrades into a coin sorting machine, and for loading software replicated from one machine into another machine.

BACKGROUND OF THE INVENTION

A variety of techniques and apparatus have been used to satisfy the requirements of automated coin sorting systems. For example, in one type of coin sorting system, coins of mixed denominations are deposited onto the top surface of a rotatable disk. As the disk is rotated, the coins are guided toward a plurality of exit stations each sized to accept a different denomination of coin based on their respective diameters. As the coins exit the various exit stations, their cumulative value may be tallied and displayed to the operator. Additionally, the coin sorting system may be equipped with discrimination sensors such as eddy current sensors to discriminate among various coins.

In the more sophisticated of such coin sorting systems, a system controller with associated control software is provided for controlling the operation of the machine. The control software is typically encoded by the manufacturer with a set of operating parameters associated with the machine, some or all of which may be customized or tailored by the user. An operator interface panel, including a touch screen keypad/display, may be provided to permit an operator or technician to customize the control software and/or communicate operating instructions to the system controller. The control software may be encoded with "default" settings associated with operation the machine, including default display settings defining the positions and/or labels associated with particular keys and defining the style and level of complexity of the various operating screens. In embodiments with discrimination sensors, the default settings may further include known physical and/or electrical characteristics of several denominations of coins, or acceptable ranges of such characteristics, for comparison to the coins which are to be discriminated. Through the operator interface panel, the operator or technician may customize or re-program a portion of the control software by introducing the modified code via the touch screen keypad. For example, the user may customize or tailor the touch screen keypad/display to redefine the names or labels associated with particular keys, delete keys, reposition keys and/or modify the complexity of the operator interface panel to match the level of operator experience.

In addition to operator-initiated changes, the control software may be subject to periodic manufacturer-initiated changes to correct design errors, make field updates, or produce coin sorting machines dedicated to special environments. For example, in embodiments with discrimination sensors, the manufacturer may desire to modify the control software to accommodate new series of coins or foreign coins, by encoding the control software with known physical and/or electrical characteristics (or acceptable ranges thereof) of the coins to be accommodated. Heretofore, software upgrades from the manufacturer have typically required removing, erasing, reprogramming and replacing the resident EPROM chips on which the control software resides. Because EPROM chips are sensitive to mechanical and electrostatic damage, neither of these steps can generally be accomplished by the operator, but must rather be accomplished by trained service personnel. In particular, mechanical damage to the chip is likely to occur during the removal process unless special tools are used to pry the chip from its socket within the machine. Once removed from the machine, EPROM chips are typically shipped to an off-site service center to be erased. Because of their sensitivity to damage, they must be shipped in special containers to protect them from mechanical and electrostatic damage. The chips are erased and reprogrammed at the service center and delivered to the customer, where they are reinstalled in the machines by trained service personnel.

In contrast, although the "customizable" portion of the control software may be changed with relative convenience at the operator interface panel, several keystrokes may be required depending on the extent of the changes. Moreover, because each coin sorting machine may be operated by several individual operators, the customizable portion of the control software of each machine may be subject to frequent changes in order to accommodate the needs of each individual operator.

Accordingly, in view of the above problems, there is a need for a software loading system that enables users of coin sorting machines to more quickly and easily update the system software and/or tailor the control software of their machines without removing and replacing resident memory chips and without entering several keystrokes. The present invention is directed to addressing these needs.

SUMMARY OF THE INVENTION

In accordance with one aspect of the present invention, there is provided a coin sorting system comprising a coin sorter for sorting a plurality of coins, the coin sorter including a coin-guiding surface forming a plurality of exit stations for selectively allowing exiting of the coins based upon their respective diameters. A system controller is coupled to the coin sorter and executes control software associated with the coin sorter. An operator interface panel is coupled to the system controller, the operator interface panel including a touch screen display for displaying keys associated with operation of the coin sorting system. A resident memory is coupled to the system controller and contains a first version of control software to be executed by the system controller, the first version of control software including a first display setting of the touch screen display. A flash card having a flash card memory is adapted to be removably electrically coupled to the coin sorter. The flash card memory contains a second version of control software to be executed by the system controller, the second version of control software including a second display setting of the touch screen display. The resident memory is adapted to erase the first version of control software and store the second version of control software in response to the flash card being electrically coupled to the coin sorter. The resident memory is adapted to retain the second version of control software in response to the flash card being thereafter removed from the coin sorter.

In accordance with another aspect of the present invention, there is provided a coin sorting machine comprising a coin sorter for sorting a plurality of coins, the coin sorter including a coin-guiding surface forming a plurality of exit stations for selectively allowing exiting of the coins based upon their respective diameters. A system controller is coupled to the coin sorter and an operator interface panel is coupled to the system controller. The operator interface panel includes a touch screen display for displaying keys associated with operation of the coin sorting system. A resident flash memory is coupled to the system controller and contains control software to be executed by the system controller, the control software including a customized setting of the touch screen display. A flash card having a flash card memory is removably received within a socket electrically coupled to the resident flash memory of the coin sorting machine. Control software is copied from the resident flash memory to the flash card memory in response to the flash card being inserted into the socket. The flash card thereafter is adapted to be removed from the socket and electrically coupled to a plurality of secondary coin sorting machines, the customized settings of the touch screen display being copied from the flash card memory to the resident flash memorys of the secondary coin sorting machines in response to the flash card being electrically coupled to the plurality of secondary currency handling machines.

BRIEF DESCRIPTION OF THE DRAWINGS

The foregoing and other advantages of the invention will become apparent upon reading the following detailed description and upon reference to the drawings in which:

FIG. 6 is in a setup mode;

FIG. 6 is in a diagnostic test mode;

DESCRIPTION OF SPECIFIC EMBODIMENTS

Figure 1:
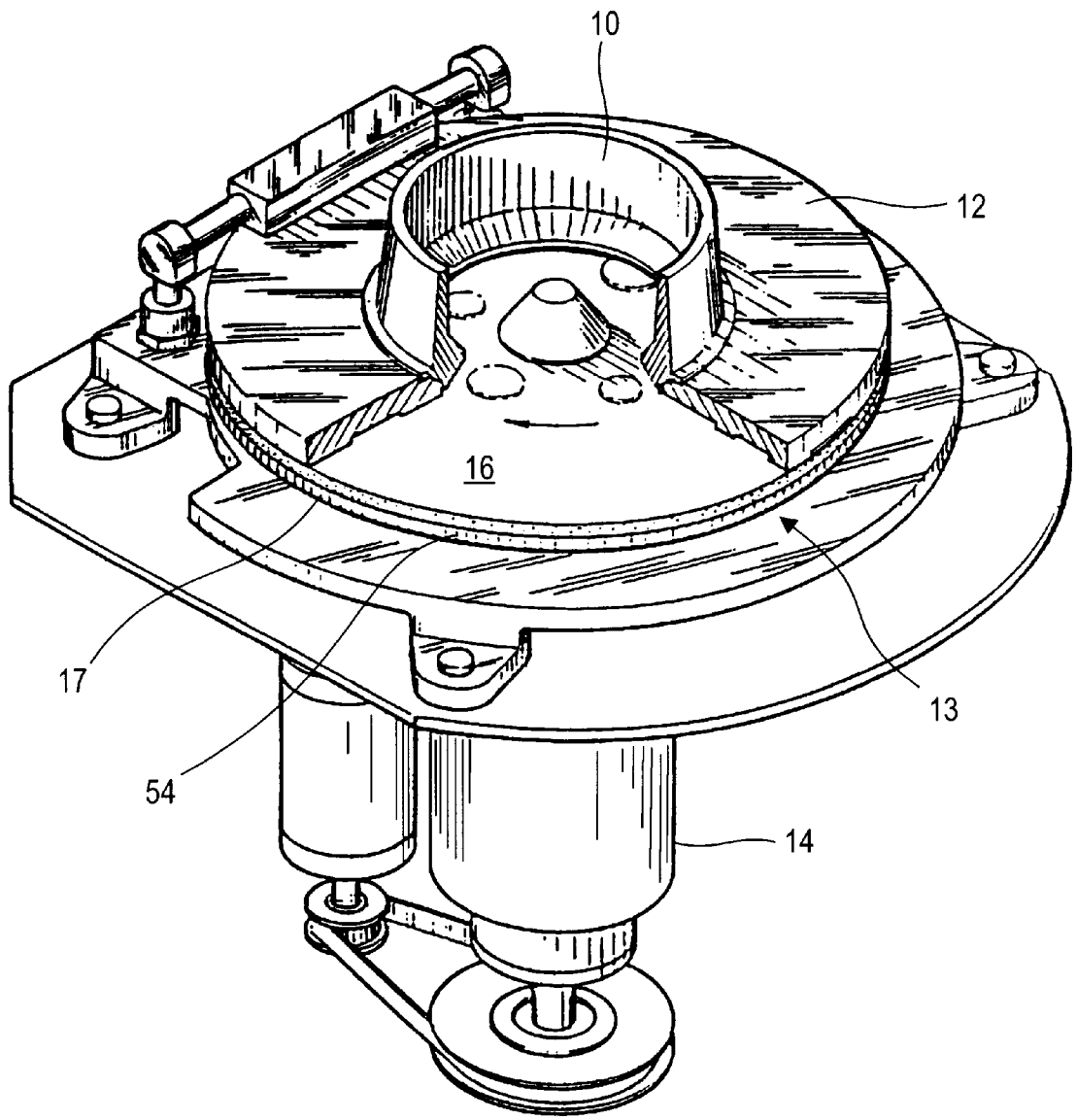
FIG. 1 is perspective view of a disc-type coin sorter with portions thereof broken away to show the internal structure.

Turning now to the drawings and referring initially to FIG. 1, there is shown a disc-type coin sorter in which a hopper 10 receives coins of mixed denominations and feeds them through central openings in an annular sorting head or guide plate 12. As the coins pass through these openings, they are deposited on the top surface of a rotatable disc 13. This disc 13 is mounted for rotation on a stub shaft (not shown) and driven by an electric motor 14. The disc 13 comprises a resilient pad 16, preferably made of a resilient rubber or polymeric material, bonded to the top surface of a solid metal disc 17.

As the disc 13 is rotated, the coins deposited on the top surface thereof tend to slide outwardly over the surface of the pad due to centrifugal force. As the coins move outwardly, those coins which are lying flat on the pad enter the gap between the pad surface and the guide plate 12 because the underside of the inner periphery of this plate is spaced above the pad 16 by a distance which is about the same as the thickness of the thickest coin.

Figure 2:
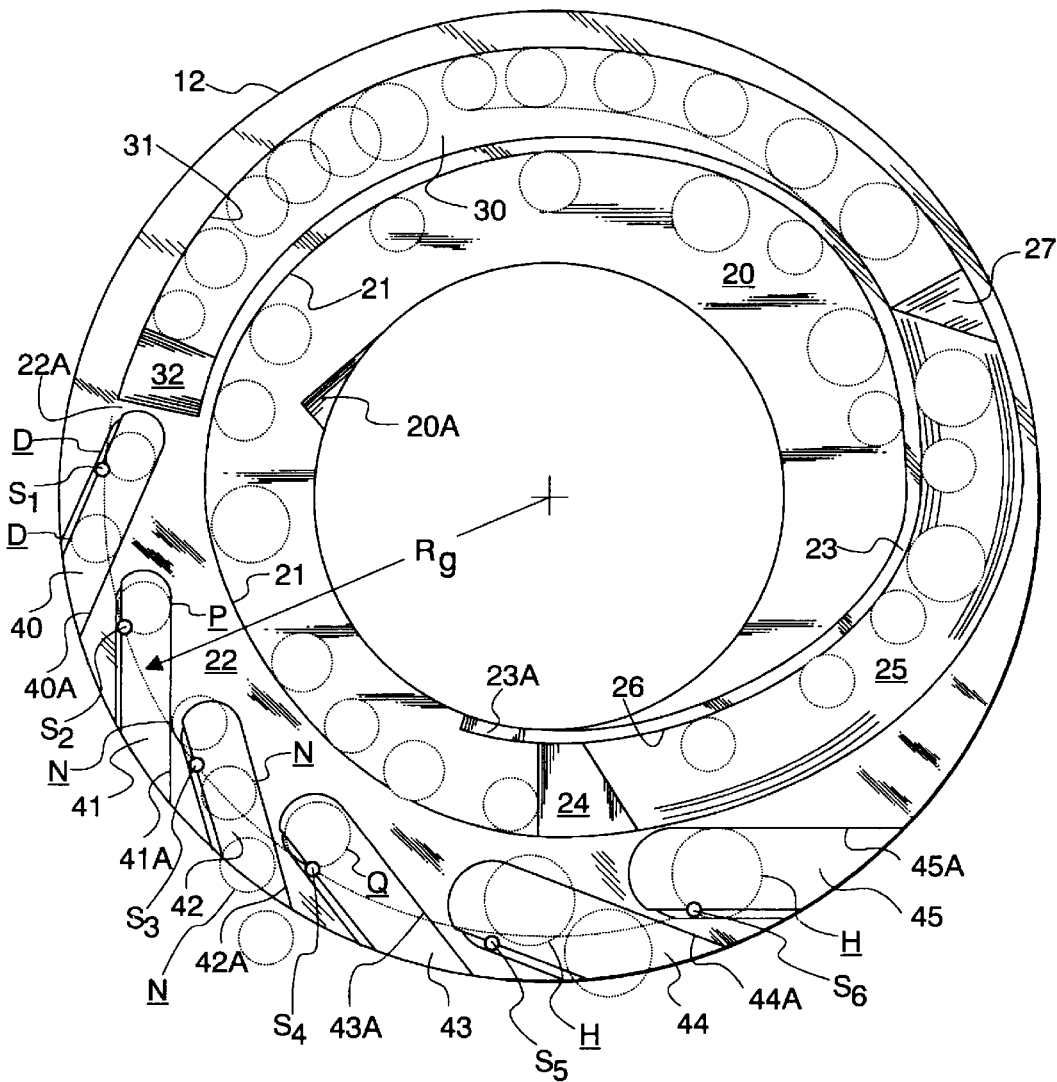
FIG. 2 is an enlarged bottom plan view of a sorting head or guide plate in the coin sorter of FIG. 1.

FIG. 2 illustrates an enlarged bottom plan view of the sorting head or guide plate 12 of the coin sorter of FIG. 1. As the coins are propelled radially outward by rotational movement of the pad 16, they initially enter an annular recess 20 formed in the underside of the guide plate 12 and extending around a major portion of the inner periphery of the annular guide plate. The outer wall 21 of the recess 20 extends downwardly to the lowermost surface 22 of the guide plate. Consequently, the initial radial movement of the coins is terminated when they engage the wall 21 of the recess 20, though the coins continue to move circumferentially along the wall 21 by rotational movement of the pad 16. Overlapping coins which only partially enter the recess 20 are stripped apart by a notch 20a formed in the top surface of the recess 20 along its inner edge.

The only portion of the central opening of the guide plate 12 which does not open directly into the recess 20 is that sector of the periphery which is occupied by a land 23 whose lower surface is at the same elevation as the lowermost surface 22 of the guide plate. The upstream end of the land 23 forms a ramp 23a, which prevents certain coins stacked on top of each other from reaching the ramp 24. When two or more coins are stacked on top of each other, they may be pressed into the resilient pad 16 even within the deep peripheral recess 20. Consequently, stacked coins can be located at different radial positions within the channel 20 as they approach the land 23. When such a pair of stacked coins has only partially entered the recess 20, they engage the ramp 23a on the leading edge of the land 23. The ramp 23a presses the stacked coins downwardly into the resilient pad 16, which retards the lower coin while the upper coin continues to be advanced. Thus, the stacked coins are stripped apart so that they can be recycled and once again enter the recess 20, this time in a single layer.

When a stacked pair of coins has moved out into the recess 20 before reaching the land 23, the stacked coins engage the inner spiral wall 26. The vertical dimension of the wall 26 is slightly less than the thickness of the thinnest coin, so the lower coin in a stacked pair passes beneath the wall and is recycled while the upper coin in the stacked pair is cammed outwardly along the wall 26. Thus, the two coins are stripped apart with the upper coin moving along the guide wall 26, while the lower coin is recycled.

As coins within the recess 20 approach the land 23, those coins move outwardly around the land 23 and engage a ramp 24 leading into a recess 25 which is an outward extension of the inner peripheral recess 20. The recess 25 is preferably just slightly wider than the diameter of the coin denomination having the greatest diameter. The top surface of the major portion of the recess 25 is spaced away from the top of the pad 16 by a distance that is less than the thickness of the thinnest coin so that the coins are gripped between the guide plate 12 and the resilient pad 16 as they are rotated through the recess 25. Thus, coins which move into the recess 25 are all rotated into engagement with the outwardly spiralling inner wall 26, and then continue to move outwardly through the recess 25 with the inner edges of all the coins riding along the spiral wall 26. The primary purpose of the outward spiral formed by the wall 26 is to space apart the coins so that during normal steady-state operation of the sorter, successive coins will not be touching each other.

Rotation of the pad 16 continues to move the coins along the wall 26 until those coins engage a ramp 27 sloping downwardly from the recess 25 to a referencing recess 30 of the guide plate 12. Because the surface of the referencing recess 30 is located closer to the pad 16 than the recess 25, the effect of the ramp 27 is to further depress the coins into the resilient pad 16 as the coins are advanced along the ramp by the rotating disc. As the coins emerge from the ramp 27, the coins enter the referencing recess 30 which presses all coin denominations firmly against the resilient pad 16. The outer edge of this recess 30 forms an inwardly spiralling wall 31 which engages and precisely positions the outer edges of the coins before the coins reach the exit channels which serve as means for discriminating among coins of different denominations according to their different diameters.

The inwardly spiralling wall 31 reduces the spacing between successive coins, but only to a minor extent so that successive coins remain spaced apart. The inward spiral closes any spaces between the wall 31 and the outer edges of the coins so that the outer edges of all the coins are eventually located at a common radial position, against the wall 31, regardless of where the outer edges of those coins were located when they initially entered the recess 30.

At the downstream end of the referencing recess 30, a ramp 32 slopes downwardly from the top surface of the referencing recess 30 to region 22a of the lowermost surface 22 of the guide plate. Thus, at the downstream end of the ramp 32 the coins are gripped between the guide plate 12 and the resilient pad 16 with the maximum compressive force. This ensures that the coins are held securely in the radial position initially determined by the wall 31 of the referencing recess 30.

Beyond the referencing recess 30, the guide plate 12 forms a series of exit channels 40, 41, 42, 43, 44 and 45 which function as selecting means to discharge coins of different denominations at different circumferential locations around the periphery of the guide plate. Thus, the channels 40–45 are spaced circumferentially around the outer periphery of the plate 12, with the innermost edges of successive pairs of channels located progressively farther away from the common radial location of the outer edges of all coins for receiving and ejecting coins in order of increasing diameter. In the particular embodiment illustrated, the six channels 40–45 are positioned and dimensioned to eject dimes (channel 40), pennies (channel 41), nickels (channel 42), quarters (channel 43), dollars (channel 44), and half dollars (channel 45). The innermost edges of the exit channels 40–45 are positioned so that the inner edge of a coin of only one particular denomination can enter each channel; the coins of all other denominations reaching a given exit channel extend inwardly beyond the innermost edge of that particular channel so that those coins cannot enter the channel and, therefore, continue on to the next exit channel.

For example, the first exit channel 40 is intended to discharge only dimes, and thus the innermost edge 40a of this channel is located at a radius that is spaced inwardly from the radius of the referencing wall 31 by a distance that is only slightly greater than the diameter of a dime. Consequently, only dimes can enter the channel 40. Because the outer edges of all denominations of coins are located at the same radial position when they leave the referencing recess 30, the inner edges of the pennies, nickels, quarters, dollars, and half dollars all extend inwardly beyond the innermost edge 40a of the channel 40, thereby preventing these coins from entering that particular channel. This is illustrated in FIG. 2 which shows a dime D captured in the channel 40, while pennies P, nickels N, quarters Q, dollars S, and half dollars H bypass the channel 40 because their inner edges extend inwardly beyond the innermost edge 40a of the channel so that they remain gripped between the guide plate surface 22b and the resilient pad 16.

Of the coins that reach channel 41, the inner edges of only the pennies are located close enough to the periphery of the guide plate 12 to enter this exit channel. The inner edges of the nickels, quarters, dollars, and half dollars extend inwardly beyond the innermost edge 41a of the channel 41 so that they remain gripped between the guide plate and the resilient pad. Consequently, the nickels, quarters, dollars, and half dollars are rotated past the channel 41 and continue on to the next exit channel. This is illustrated in FIG. 2 which shows pennies P captured in the channel 41, while nickels N, quarters Q, dollars S, and half dollars H bypass the channel 41 because the inner edges of these coins extend inwardly beyond the innermost edge 41a of the channel 41. Similarly, only nickels can enter the channel 42, only quarters can enter the channel 43, only dollars can enter the channel 44, and only half dollars can enter the channel 45.

As can be seen in FIG. 2, coin proximity sensors $S_1$, $S_2$, $S_3$, $S_4$, $S_5$, and $S_6$ are mounted in the upper surfaces of the respective exit channels 41–45 along the outboard edges thereof. The effective fields of the sensors S1–S6 are all located just outboard of the radius $R_g$ at which the outer edges of all coin denominations are gaged before they reach the exit channels 40–45, so that each sensor detects only the coins which enter its exit channel and does not detect the coins which bypass that exit channel. Thus, in FIG. 2 the circumferential path followed by the outer edges of all coins as they traverse the exit channels is illustrated by the dashed-line arc $R_g$. Only the largest coin denomination (e.g., U.S. half dollars) reaches the sixth exit channel 45, and thus the location of the sensor in this exit channel is not as critical as in the other exit channels 350–354. A counting system accumulates electrical pulses from the six sensors $S_1$–$S_6$ to yield actual counts $C_D$, $C_P$, $C_N$, $C_Q$, $C_S$, and $C_H$ of dimes, pennies, nickels, quarters, dollars, and half dollars passing through the respective exit channels 40, 41, 42, 43, 44, and 45.

According to one embodiment of the present invention, the coin sorting system is further equipped with a plurality of discrimination sensors (not shown) in each of the respective exit channels 40 through 45 to discriminate among various denominations of coins. One such coin sorting system is described in U.S. Patent application Ser. No. 08/399,771, now U.S. Pat. No. 5,630,494 assigned to the assignee of the present invention and incorporated herein by reference in its entirety. The discrimination sensors generally include an excitation coil and a detection coil. The excitation coil produces an alternating magnetic field which couples to the coin(s) and induces eddy currents in the coins. The detection coil includes a pair of windings for detecting the eddy currents in the coins. Generally, the composition of the coins may be determined by analyzing the magnitude and/or phase of the differential voltage produced in the windings of the detection coil. When one of the discrimination sensors detects a coin material that is not the proper material for coins in that exit channel, the disc may be stopped by de-energizing or disengaging the drive motor and engaging a brake. The suspect coin may then be discharged by jogging the drive motor with one or more electrical pulses until the trailing edge of the suspect coin clears the exit edge of its exit channel. The exact disc movement required to move the trailing edge of a coin from its sensor to the exit edge of its exit channel can be empirically determined for each coin denomination and then stored in the memory of the control system. An encoder on the sorter disc can then be used to measure the actual disc movement following the sensing of the suspect coin, so that the disc can be stopped at the precise position where the suspect coin clears the exit edge of its exit channel, thereby ensuring that no coins following the suspect coin are discharged.

Figure 3:
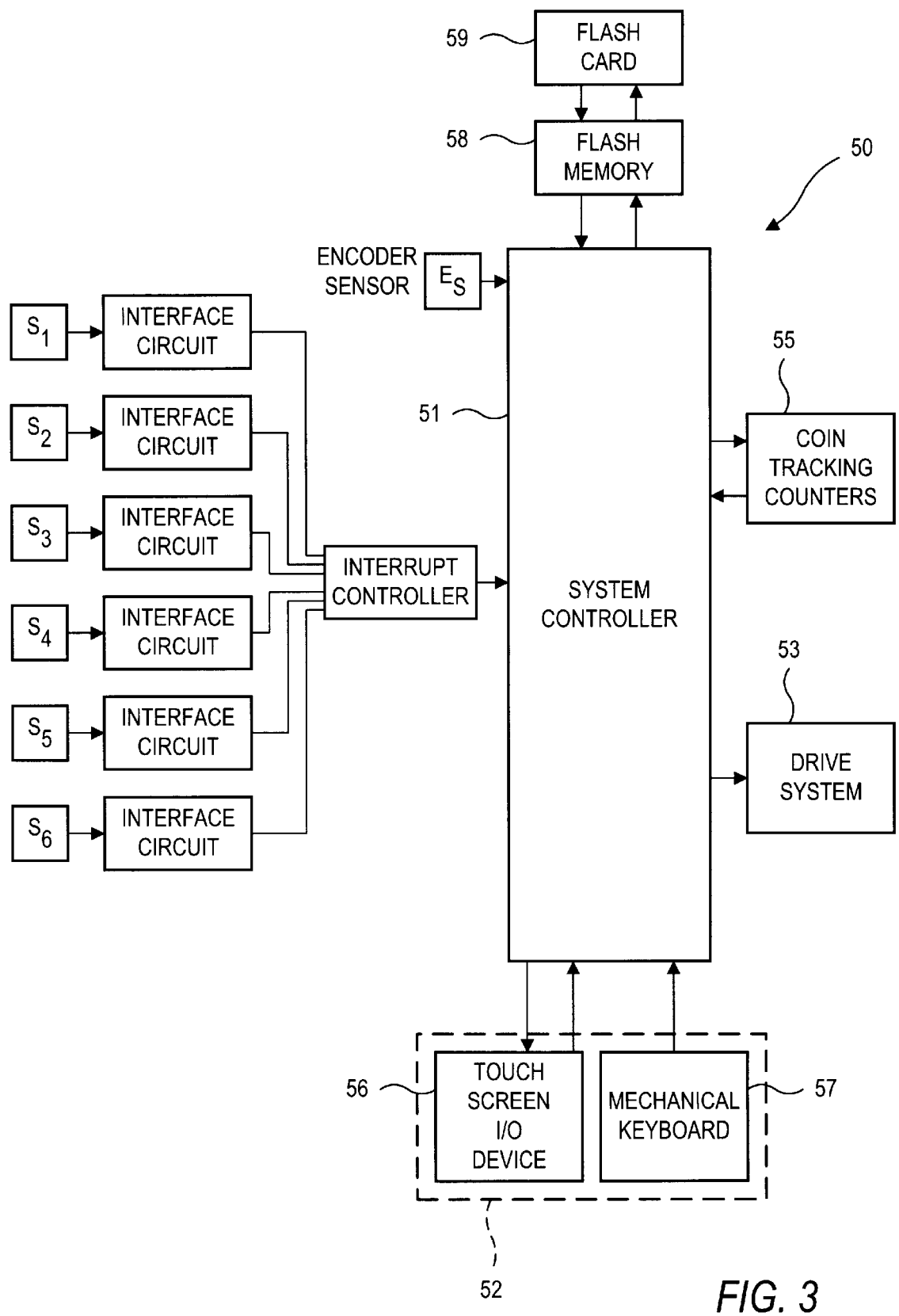
FIG. 3 is a block diagram of a processor-based control system for the coin sorter of FIG. 1 with a software loading capability according to one embodiment of the present invention.

Referring now to FIG. 3, there is shown an upper level block diagram of a processor-based control system 50 for controlling the operation of the coin sorter in FIG. 1. The control system 50 includes a system controller 51 for monitoring and regulating the various parameters involved in the coin sorting/counting and bag-stopping operations. The controller 51 accepts signals from an operator interface panel 52, the six coin sensors $S_1$–$S_6$, an encoder sensor $E_S$, and six coin-tracking counters 55. Additionally, in embodiments including discrimination sensors in each of the exit channels, the controller 51 accepts signals from the six discrimination sensors (not shown). The operator interface panel 52 includes a touch screen input/output device 56 and a conventional mechanical keyboard 57 with depressible keys. The controller 51 produces output signals to control the drive system 53, the six coin-tracking counters, and the touch screen device 56 of the operator interface panel 52.

The encoder sensor $E_S$ provides for precise monitoring of the angular movement of the disc 16 (FIG. 1). Returning briefly to FIG. 1, it can be observed that the outer peripheral surface 17 of the disc 13 carries an encoder in the form of a large number of uniformly spaced indicia 54. Upon rotational movement of the disc 13, the spaced indicia 54 are sensed by the encoder sensor $E_S$ (not visible in FIG. 1) mounted adjacent to the outer surface 17 of the disc 13. For example, in an embodiment with 720 indicia 54, the encoder sensor $E_S$ will produce an output pulse for every 0.5° of rotational movement of the disc 13. The pulses from the encoder sensor are supplied to six coin-tracking down counters 55 (FIG. 3) for separately monitoring the movement of each of the six coin denominations in the exit channels 40–45 of the sorting head. The outputs of these six counters can then be used to separately control the actuation of a drive system 53 (FIG. 3), which includes a drive motor and a brake. For example, whenever one of the counts $C_D$, $C_P$, $C_N$, $C_Q$, $C_S$, and $C_H$ reaches its limit, the controller 51 generates a control signal to initiate a bag-stop function. For the bag-stop function, the control signal preferably stops the drive for the rotating disc and at the same time actuates the brake for the disc. The disc drive can be stopped either by de-energizing the drive motor or by actuating a clutch which de-couples the drive motor from the disc. The structure and operation of both the encoder 54, encoder sensor $E_S$, and the drive system 53 are described in further detail in U.S. Pat. No. 5,299,977 to Mazur et al. entitled "Coin Handling System" and incorporated herein by reference.

Control software associated with the system controller 51 is stored in a resident "flash memory" 58, which in turn is adapted to be electrically connected to a flash card 59. Generally, the control software includes operating instructions and parameters for the coin sorting system, including those which have been initiated by the manufacturer and those which have been tailored or customized by the operator. Electrical signals communicated between the flash card 59 and flash memory 58 may cause the control software to be copied from the flash card 59 to the flash memory 58 or vice versa. The flash card 59 may thereafter be introduced into additional machines, as will be described in detail hereinafter.

As will be appreciated by those skilled in the art, the resident memory need not be comprised of a flash memory but may be comprised of any of several alternative types of memories known in the art, including electrically erasable programmable read only memories (EEPROMs) or random access memories (RAMs). Nevertheless, flash memories are preferred because they are nonvolatile (e.g. their data content is preserved without requiring connection to a power supply), they may be electrically erased and reprogrammed within fractions of a second by simply sending electrical control signals to the flash memory while it remains within the machine, and they are less expensive than EEPROMs. In one embodiment, the resident flash memory 58 is electrically programmable in sectors so that portions of the memory can be individually erased and reprogrammed. An example of a specific type of flash memory which may be used in the coin sorting system is product number Am29F010, commercially available from Advanced Micro Devices, Inc. ("AMD") of Sunnyvale, Calif. and described in detail in AMD's publication entitled "Flash Memory Products—1996 Data Book/Handbook", incorporated herein by reference in its entirety. However, those skilled in the art will appreciate that other types of flash memorys may be utilized, depending on the system memory requirements and desired operating characteristics.

For added flexibility, according to one embodiment of the present invention, means for quickly and easily installing or removing the resident flash memory 58 from the coin sorting machine may be provided. As will be appreciated, there are several devices known in the art which may be utilized to accomplish this purpose. One solution is to house the flash memory chip in a zero insertion force ("ZIF") socket, in which movable contacts can be opened to facilitate insertion or removal of the chip in the socket without damaging the lead pins of the chip. The ZIF-type socket is not limited to use with a flash memory. Typically, the movable contacts of the ZIF socket may be opened by simply depressing a lever or button on the surface of the socket. Examples of ZIF-type sockets are disclosed in U.S. Pat. No. 5,342,213 ('213 patent), incorporated herein by reference in its entirety and designated herein as FIGS. 4a and 4b, respectively.

Figure 4A:
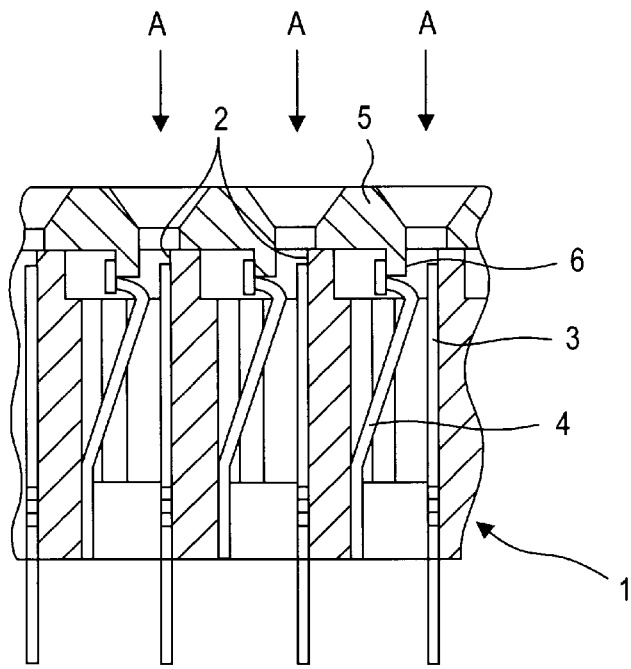
FIGS. 4a and 4b are cross sectional views of ZIF-type sockets which may be used to house the resident memory of the present invention.

FIG. 4a shows an example of a conventional ZIF-type socket. As described in the '213 patent, the socket has holes 2 on the surface of a socket body 1. Lead pins of an IC device are inserted into the holes 2 as indicated with arrows A. After being inserted through the holes 2, the lead pins encounter contacts positioned beneath the holes 2 for receiving the lead pins. Each of the contacts is made up of a first contact element 3 that is fixed and a second contact element 4 that is elastically deformable. Lead pins are inserted between the first and second contact elements 3 and 4, and then locked. An actuator 5 is installed to open or close the contacts. In the example shown in FIG. 4a, the actuator 5 is formed with a movable plate arranged on the surface of the socket body 1, and has engaging means 6 that engage with the tops of the second contact elements 4. When lead pins are inserted, the actuator 5 is moved left. Then, the second contact elements 4 are moved left accordingly. Thereby, openings are created between the second contact elements 4 and the first contact elements 3. The lead pins are inserted smoothly without being subject to applied force by the contacts. When the lead pins are inserted into the contacts, the actuator 5 is moved right. Then, the second contact members are moved right and reset to the original positions. Eventually, the lead pins are held between the first and second contact elements 3 and 4.

Figure 4B:
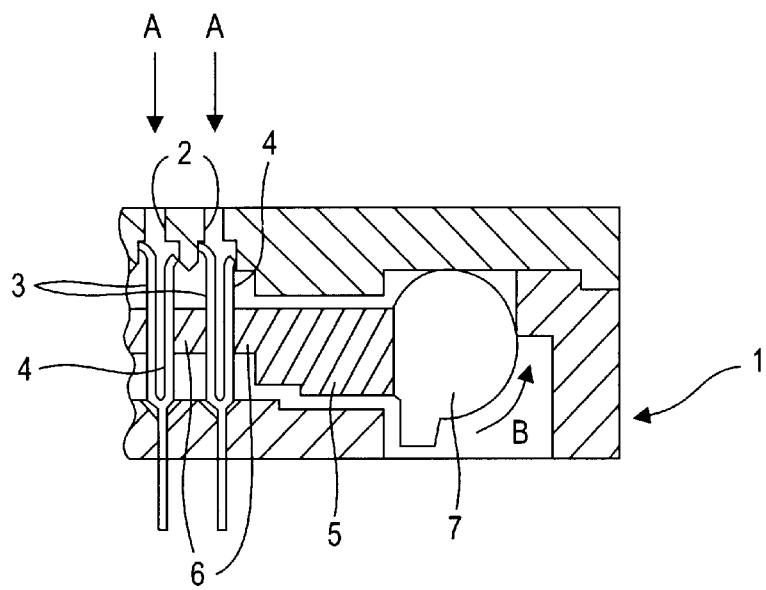

FIG. 4b shows another example of a conventional ZIF-type socket. As described in the '213 patent, the socket has holes 2 on the surface of a socket body 1. Lead pins of an IC device are inserted into the holes 2 as indicated with arrows A. After being inserted through the holes 2, the lead pins encounter contacts positioned beneath the holes 2 for receiving the lead pins. Each of the contacts includes a first contact element 3 that is fixed and a second contact element 4 that is elastically deformable. The lead pins are inserted and held between the first and second contact elements 3 and 4. An actuator 5 is provided to open or close the contacts. In the example shown in FIG. 4b, the actuator 5 is arranged inside the socket body 1 and includes an engaging means 6 for pressing the second contact elements 4 toward the first contact elements 3. The actuator 5 is pressed leftward by a cam 7. When lead pins are inserted, the actuator 5 lies at a position as illustrated. Openings are created between the second contact element 4 and the first contact elements 3. The lead pins are inserted smoothly without being subject to appied forces by the contacts. When the lead pins are inserted into the contacts, the cam 7 is rotated in the direction of arrow B to move the actuator 5 to the left. Then, the second contact elements 4 are moved toward the first contact elements 3. The lead pins are held between the first and second contact elements 3 and 4. In FIGS. 4a and 4b, the first and second contact elements 3 and 4 are connected to a circuit board.

Figure 5:
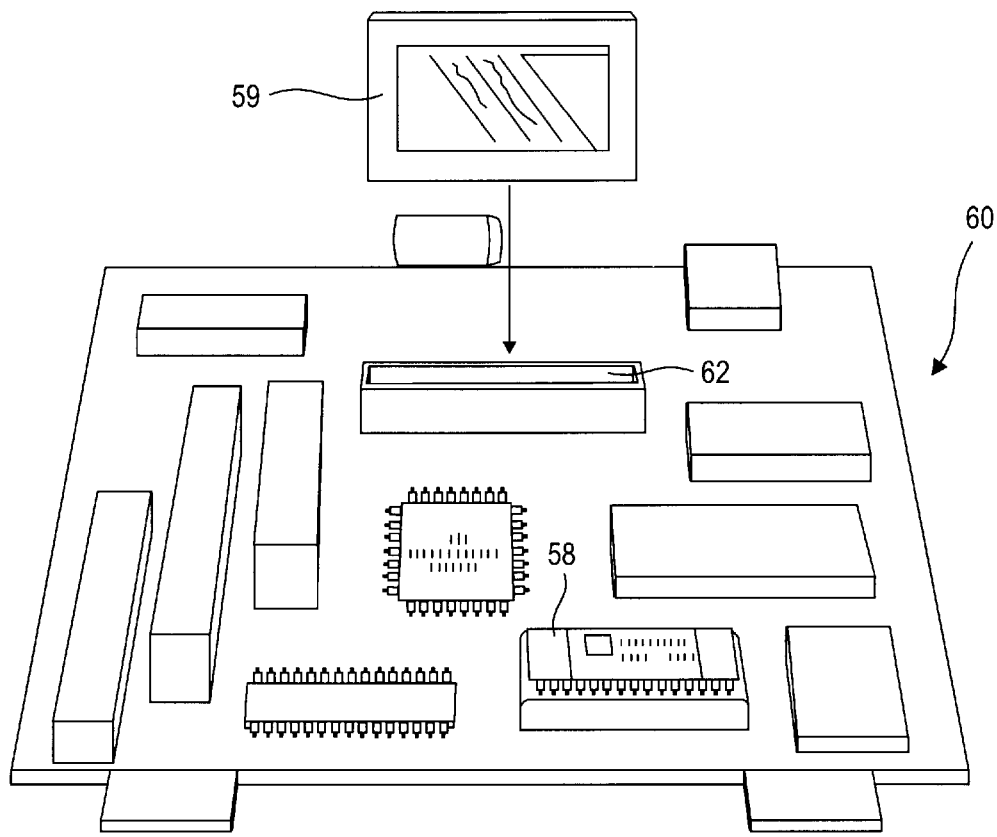
FIG. 5 is an isometric view depicting a socket for accepting a flash card according to one embodiment of the present invention.

Now referring to FIG. 5, there is shown a circuit board assembly 60 including a socket 62 adapted to receive the flash card 59 according to one embodiment of the invention. The socket 62 is electrically connected to the resident flash memory 58 of the coin sorting system by means of an electrical path (not shown) on the circuit board assembly 60. Typically, the circuit board assembly 60 is enclosed within an external housing (not shown) of the coin sorting machine, with an external slot (not shown) positioned adjacent to the socket 62 such that the flash card 59 may access the socket 62 without removing the external housing. Upon insertion of the flash card 59 into the socket 62, electrical signals are communicated between the flash card 59 and the resident flash memory 58 of the coin sorting system.

The flash card 59 contains its own memory which, for example, may be encoded with software reflecting updated operating instructions and parameters for the coin sorting machine. In one embodiment, the flash card 59 is programmed with such code by the manufacturer, with the resident flash memory 58 adapted to read and copy the updated code and the system controller 51 (FIG. 3) executing the updated code. Alternatively or additionally, the process may be reversed, with the flash card 59 reading and copying the code from the resident flash memory 58 of a particular coin sorting machine. The flash card memory may then be copied onto the resident flash memories 58 of a plurality of additional coin sorting machines in the manner described above, causing the resident flash memory 58 of the initial machine to be "cloned" onto the resident flash memories 58 of the additional machines. In such case, the system controller 51 (FIG. 3) of the additional machines will thereby execute control sofware which is identical to the control software of the "cloned" machine. Similar to the system memory, the flash card memory need not be a flash memory but may be comprised of any of several other types of memorys known in the art, including electrically eraseable programmable read only memorys (EEPROMs) or one-time programmable read-only memorys. Nevertheless, a flash memory is preferred because it offers a high degree of versatility at a relatively low cost.

The flash card 59 should be small and lightweight, sturdy enough to withstand multiple uses, and adapted to be easily insertable into the slot (not shown) and corresponding socket 62 of the coin sorting system by users not having any special training. Further, the flash card 59 should not require any special electrostatic or physical protection to protect it from damage during shipping and handling. One type of flash card that has been found to satisfy these criteria is the FlashLite™ Memory Card available from AMP, Inc. of Harrisburg, Pa. However, it is envisioned that other suitable types of flash cards will become available from other manufacturers. The FlashLite™ card has a thickness of 3.3 mm (⅛ inch), a width of approximately 45 mm (1.8 inches) and a 68-pin connector interface compatible with the Personal Computer Memory Card International Association (PCMCIA) industry standards. Its length may be varied to suit the needs of the user. In one embodiment, two sizes of flashcards (designated "half size" and "full size") have lengths of 2.1 inches (53 mm) and 3.3 inches (84 mm), respectively, but other sizes of flash cards may also be utilized.

In one embodiment of the present invention, the socket 62 comprises a PCMCIA-compatible 68-position receptacle for receiving a flash card such as the above described FlashLite™ card. For example, one type of socket that may be used for this purpose is AMP, Inc. product number 146773-1, which is adapted to extend vertically from the circuit board assembly 60. However, it will be appreciated that other types of sockets may be utilized, including those positioned horizontally in relation to the circuit board assembly 60, or those including a lever or button which may be depressed to eject the flash card 59 from the socket 62.

Upon insertion of the flash card 59 into the socket 62, the system controller 51 (FIG. 3) is capable of electrically detecting the presence of the card. If the FlashLite™ card is used, this is accomplished by means of two specially designated connector pins $CD_1$ and $CD_2$ (assigned to pin numbers 36 and 67, respectively) being shorted to ground. The system controller 51 then compares the contents of the flash card memory with the contents of the resident flash memory. If the contents of the memorys are the same, an audible or visual message is provided to the user indicating that the process is concluded. If the contents of the memorys are different, the required sectors in the resident flash memory 58 are erased and the new code is copied from the flash card 59 to the resident flash memory 58. Upon successful completion of the memory transfer, an audible or visual message is provided to the user indicating that the process is concluded. The flash card 59 can thereafter be unplugged from the socket 62 and plugged into the corresponding sockets 62 of any other coin sorting machines requiring a software update. In the event of an unsuccessful memory transfer, the machine will automatically re-attempt the transfer until, after multiple unsuccessful attempts, the user will be advised that there is a hard system failure and to call for service. Optionally, the flash card 59 may include a counter for limiting the number of times that a given flash card 59 may be copied into the resident flash memory of additional machines. For example, the flash card 59 may include a cycle count byte which is preset to a designated number and decrements upon each copy cycle.

The flash card 59 may also be used in a reverse manner, to "clone" a particular machine by copying the resident memory 58 of the machine onto a flash card 59 and subsequently using the flash card 59 to introduce the identical code into other machines. In this case, upon connection of the flash card 59 to the resident flash memory 58, if the contents of the memorys are different, the required sectors in the flash card memory are erased and replaced with new code copied from the resident flash memory 58. If the contents of the memorys are the same, an audible or visual message is provided to the user indicating that the process is concluded. Upon successful completion of the memory transfer, the flash card memory becomes programmed with the same set of control software as the resident flash memory 58. The flash card 59 can thereafter be removed from the coin sorting machine and plugged into any other coin sorting machine requiring the "cloned" control software. The control software is copied from the flash card memory to the flash memory 58 of the additional machines in substantially the same manner (although reversed) as they were initially copied onto the flash card 59. In the event of an unsuccessful memory transfer, the machine will automatically re-attempt the transfer until, after multiple unsuccessful attempts, the user will be advised that there is a hard system failure and to call for service.

Figure 6:
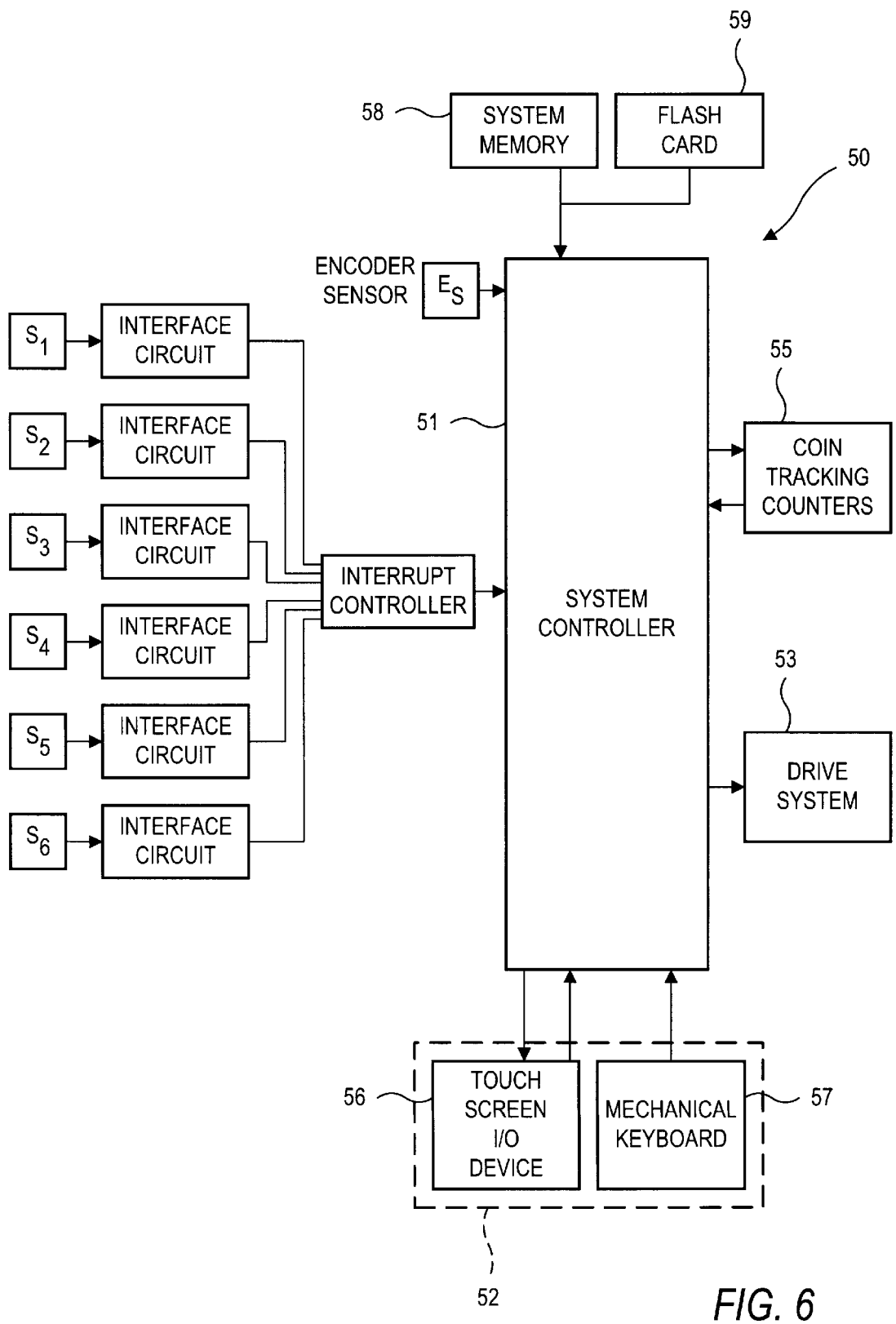
FIG. 6 is a block diagram of a processor-based control system for the coin sorter of FIG. 1 with a software loading capability according to another embodiment of the present invention.

Referring now to FIG. 6, there is shown a block diagram of a processor-based control system 50 for the coin sorter of FIG. 1 with a software loading capability according to another embodiment of the present invention. In this embodiment, the control system 50 includes a system memory 58 which is not a flash memory. For example, the system memory 58 may comprise an EPROM or other alternate type of non-flash memory. The coin sorter is also provided with a socket (not shown) adapted to receive a flash card 59 as described in relation to FIG. 5. Upon insertion of the flash card 59 into the socket, the system controller 51 electrically detects the presence of the card and executes the code directly from the flash card memory as long as the flash card 59 remains inserted in the socket. If the flash card 59 were to be removed from the socket, the system controller 51 would revert to executing the old code from the system memory 58. In this embodiment, because the flash card 59 must remain inserted in the socket in order to execute the updated code, each coin sorter system will generally be equipped with its own dedicated flash card 59.

Figure 7:
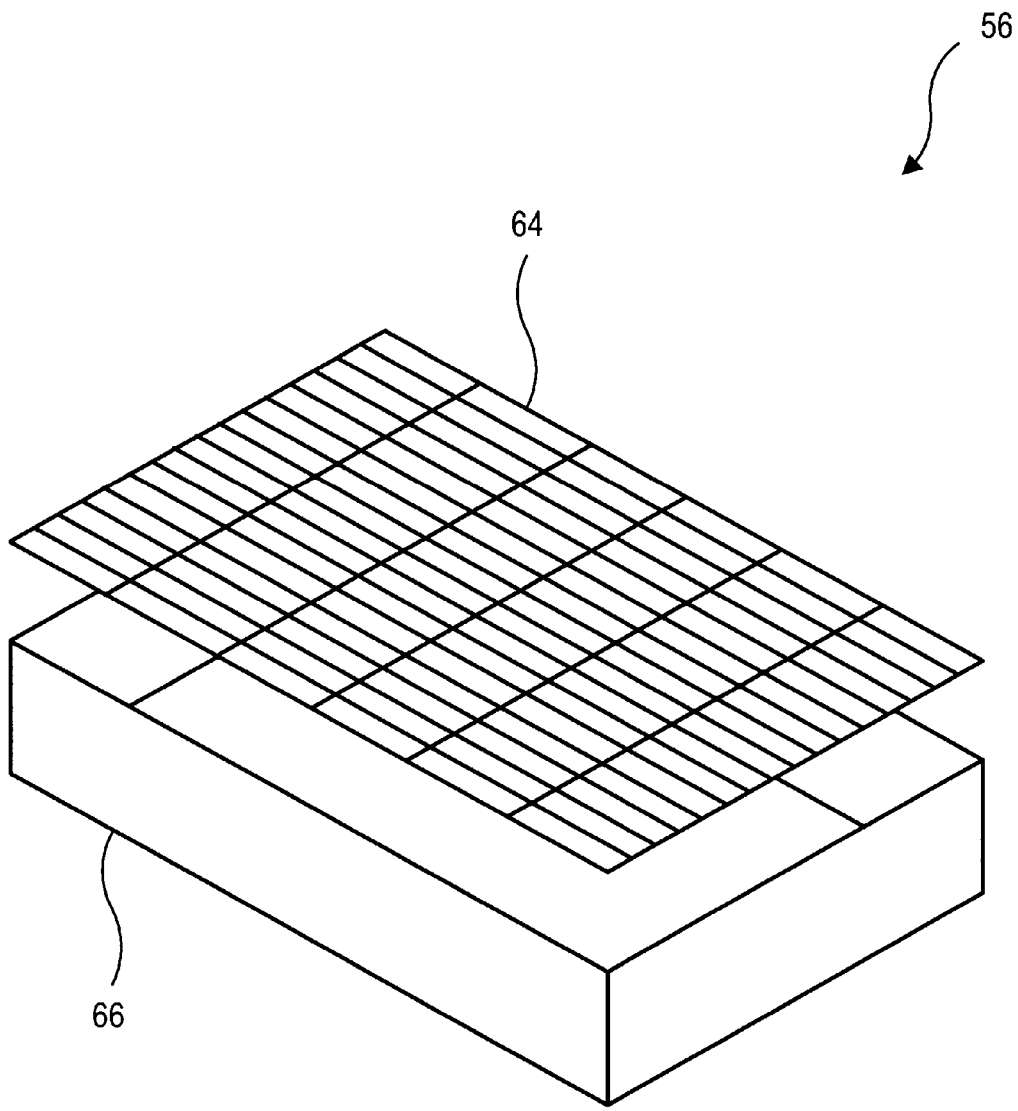
FIG. 7 is an exploded perspective view of a touch screen device which may be used in conjunction with the control systems of FIG. 3 or FIG. 6.

FIG. 7 illustrates a touch screen I/O device 56 which may be used in conjunction with the control system 50 of FIG. 3 or FIG. 6. In the illustrated embodiment, the touch screen I/O device 56 comprises a touch screen 64 mounted over a graphics display 66. In one embodiment, the display 66 is a liquid crystal display (LCD) with backlighting. The preferred display has 128 vertical pixels and 256 horizontal pixels. The display 66 contains a built-in character generator which permits the display 66 to display text and numbers having font and size pre-defined by the manufacturer of the display. The system controller 51 (FIG. 3 or FIG. 6) is programmed to permit the loading and display of custom fonts and shapes (e.g., key outlines) on the display 66. The display 66 is commercially available as Part No. GMF24012EBTW from Stanley Electric Company, Ltd., Equipment Export Section, of Tokyo, Japan.

The touch screen 64 is preferably an X-Y matrix touch screen forming a matrix of touch responsive points. In one embodiment, the touch screen 64 includes two closely spaced but normally separated layers of optical grade polyester film each having a set of parallel transparent conductors. The sets of conductors in the two spaced polyester sheets are oriented at right angles to each other so when superimposed they form a grid. Along the outside edge of each polyester layer is a bus which interconnects the conductors supported on that layer. In this manner, electrical signals from the conductors are transmitted to the system controller 51. When pressure from a finger or stylus is applied to the upper polyester layer, the set of conductors mounted to the upper layer is deflected downward into contact with the set of conductors mounted to the lower polyester layer. The contact between these sets of conductors acts as a mechanical closure of a switch element to complete an electrical circuit which is detected by the controller 51 through the respective buses at the edges of the two polyester layers, thereby providing a means for detecting the X and Y coordinates of the switch closure. A matrix touch screen 64 of the above type is commercially available from Dynapro Thin Film Products, Inc. of Milwaukee, Wis.

As illustrated in FIG. 7, the touch screen 64 forms a matrix of ninety-six optically transparent switch elements having six columns and sixteen rows. The system controller 51 (FIG. 3 or FIG. 6) is programmed to divide the switch elements in each column into groups of three to form five switches in each column. Actuation of any one of the three switch elements forming a switch actuates the switch. The uppermost switch element in each column remains on its own and is unused.

Although the touch screen 64 uses an X-Y matrix of optically transparent switches to detect the location of a touch, alternative types of touch screens may be substituted for the touch screen 64. These alternative touch screens use such well-known techniques as crossed beams of infrared light, acoustic surface waves, capacitance sensing, and resistive membranes to detect the location of a touch. The structure and operation of the alternative touch screens are described and illustrated, for example, in U.S. Pat. Nos. 5,317,140, 5,297,030, 5,231,381, 5,198,976, 5,184,115, 5,105,186, 4,931,782, 4,928,094, 4,851,616, 4,811,004, 4,806,709, and U.S. Pat. No. 4,782,328, which are incorporated herein by reference in their entirety.

The mechanical keyboard 57 (FIG. 3 or FIG. 6) is primarily used to start (activate) and stop (deactivate) the coin sorter and to enter numerical data. In one embodiment, the mechanical keyboard 57 includes a START BATCH key, START S/BAT key, VERIFY key, CONTINUE key, STOP key, END key, numeric keypad with numbers 0 through 9, CLEAR key, and ENTER key. After turning on the coin sorter with a main power switch, pressing the BATCH key actuates the drive system 53 and initiates movement of the rotatable disc 13. Coins from a batch of coins may then be fed into the activated coin sorter for sorting. After the coin sorter sorts the coins fed into the coin sorter, the STOP key may be pressed to temporarily stop movement of the rotatable disc 13. If additional unsorted coins remain in the batch, the CONTINUE key is pressed to re-activate the sorter and permit sorting of these additional coins. After the entire batch of coins has been sorted, the END key is pressed following depression of the STOP key to indicate the end of the batch of coins.

While sorting a batch of coins, an operator can also sort a sub-batch of this batch of coins using the START S/BAT key. Prior to pressing the END key to indicate the end of the batch of coins, the operator presses the START S/BAT key to actuate the drive system 53 and activate the coin sorter. The operator then feeds the sub-batch of coins into the coin sorter. After the coin sorter sorts the coins fed into the coin sorter, the STOP key may be pressed to temporarily stop movement of the rotatable disc. If additional unsorted coins remain in the sub-batch, the CONTINUE key is pressed to re-activate the sorter and permit sorting of these additional coins. After the entire sub-batch of coins has been sorted, the END key is pressed following depression of the STOP key to indicate the end of the sub-batch of coins. To indicate the end of the batch, the END key is pressed once again.

Thus, to sort a batch of coins and a sub-batch of coins within that batch of coins, an exemplary key-pressing sequence would be as follows: START BATCH key, STOP key, START S/BAT key, STOP key, END key, and END key. After the STOP key is pressed in the foregoing sequence, additional coins in a batch or sub-batch can be processed through the coin sorter by pressing the CONTINUE key followed by the STOP key.

The sorting and counting of coins can be accomplished without adding to batch, sub-batch, or day totals displayed on the display 66 of the touch screen device 56. This is done by using the VERIFY key, which is active only at the conclusion of a batch of coins. After pressing the END key to indicate the end of a coin batch, the VERIFY key is pressed to activate the coin sorter and permit sorting of coins. The STOP key is then pressed to terminate sorting. The VERIFY key is pressed a second time to exit the "verify" mode and return to the current operating condition of the coin sorter (e.g., "batch ended"). Thus, the key-pressing sequence for sorting and counting coins without adding their value to any batch, sub-batch, or day totals is the following: VERIFY key, STOP key, and VERIFY key. After the STOP key is pressed in the foregoing sequence, additional coins can be processed through the coin sorter by pressing the CONTINUE key followed by the STOP key.

The numeric keypad, the CLEAR key, and the ENTER key are primarily used for entering numerical data on the display 66 of the touch screen device 56. For example, as stated above, whenever one of the counts $C_D$, $C_P$, $C_N$, $C_Q$, $C_S$, and $C_H$ reaches its bag-stop limit, the system controller 51 causes the drive system 53 to stop rotation of the disc 13. The automatic bag-stop limit for a particular coin denomination is defined in terms of a numerical quantity. This numerical quantity can be changed by the operator while the controller 51 is in a "programmable bag stop" mode. The operator simply uses the numeric keypad to enter new bag-stop limits for one or more coin denominations. The display 66 displays each number as it is entered. After each new bag-stop limit is entered, the operator presses the ENTER key to store the new bag-stop limit. If the operator makes a mistake while entering a new bag-stop limit, the operator simply presses the CLEAR key and re-enters the bag-stop limit.

The system controller 51 is programmed to display various sets of "keys" on the display 66. The "keys" typically include key outlines and legends positioned within the key outlines. If a legend is too lengthy to fit within its associated key outline, the legend is positioned beside the key outline. Each legend designates the function of its associated key. The controller 51 links the functions of the touch screen switches to the keys displayed beneath respective ones of the switches. As a result, pressing the touch screen 64 at a location above a displayed key causes the controller 51 to perform the function associated with that displayed key. Hereinafter, references to pressing a displayed key denote that an operator is pressing the touch screen 64 at a location above the displayed key.

Using the touch screen 64, an operator can cause the system controller 51 to enter various modes, including an operating mode, setup mode, and diagnostic test mode. In the operating mode, the operator can obtain various types of information about coins processed through the coin sorter. The legends of the keys displayed on the display 66 indicate the types of information available for retrieval. To retrieve a certain type of information, the operator simply presses the touch screen 64 at a location above the displayed key which provides that information. The controller 51 indicates that the key has been pressed by illuminating that key.

Figure 20A:
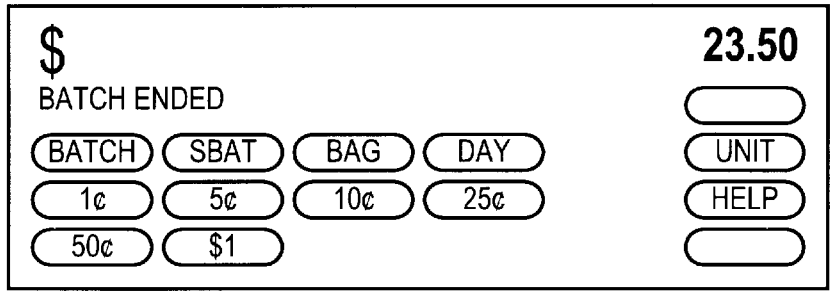
FIGS. 20a–b are diagrammatic representations of the touch screen device of FIG. 7 showing a complex display pattern and a simple display pattern.

FIG. 20a illustrates a typical display pattern on the display 66 while the controller 51 is in the operating mode. The display pattern includes a BATCH key, SBAT key, BAG key, DAY key, and coin denomination keys. When the coin sorter is processing United States coins, the display pattern typically includes a key for each of the six coin denominations, which include pennies (1 c), nickels (5 c), dimes (10 c), quarters (25 c), half dollars (50 c), and dollars ($1).

In response to pressing the BATCH key, the system controller 51 causes the display 66 to display in its upper right corner a number denoting the total coin value of a current batch of sorted coins. In response to pressing the SBAT key, the controller 51 causes the display 66 to display in its upper right corner a number denoting the total coin value of a current sub-batch of coins. In response to pressing the BAG key, the controller 51 causes the display 66 to display in its upper right corner a number denoting the total coin value in all bags capturing coins sorted with the coin sorter. In response to pressing the DAY key, the controller 51 causes the display 66 to display in its upper right corner a number denoting the total value of all coins processed through the coin sorter since the last time the "day" totals were cleared. Finally, in response to pressing one of the coin denomination keys while either the BATCH key, SBAT key, BAG key, or DAY key is activated, the controller 51 causes the display 66 to display in it upper right corner a number denoting the total value of sorted coins for the selected denomination.

As depicted in FIG. 20a, the display pattern typically includes a UNIT key which permits the operator to display in the upper right corner a number representing coin count, as opposed to monetary value, for each of the aforementioned operating mode keys. In each of its operating modes, the controller 51 preferably provides the operator with on-line help so that the operator need not always rely on instruction manuals and field support for assistance. In particular, the controller 51 causes the display 66 to display a HELP key for each display pattern. In response to pressing the HELP key, the controller 51 causes the display 66 to display a "help" screen having simplified instructions associated with the display pattern. For example, in the operating mode, pressing the HELP key in FIG. 20*a* causes the display 66 to display the following instructions: "select the desired group with the main BATCH, SBAT, etc. keys", "press the denomination keys to see individual coin amounts", and "press the EXIT key to leave this help screen". As indicated by the foregoing instructions, the help screen is provided with an EXIT key to return to the display pattern corresponding to that help screen.

Figure 8A:
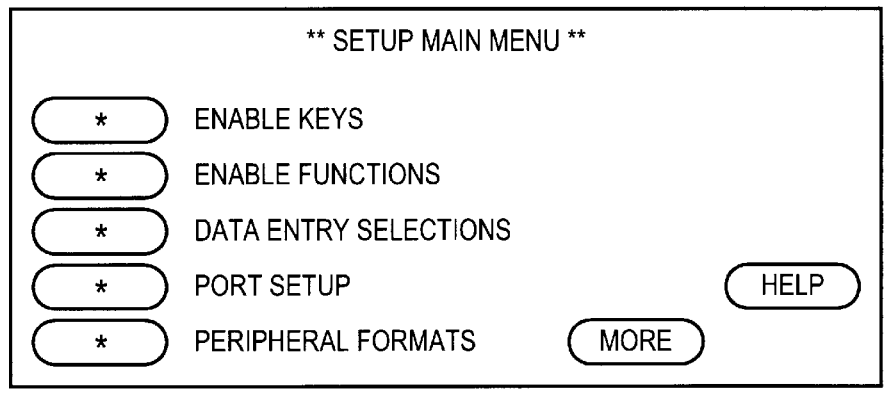
FIGS. 8a–b are diagrammatic representations of the touch screen device of FIG. 7 showing a main setup menu while the controller of FIG. 3
Figure 8B:
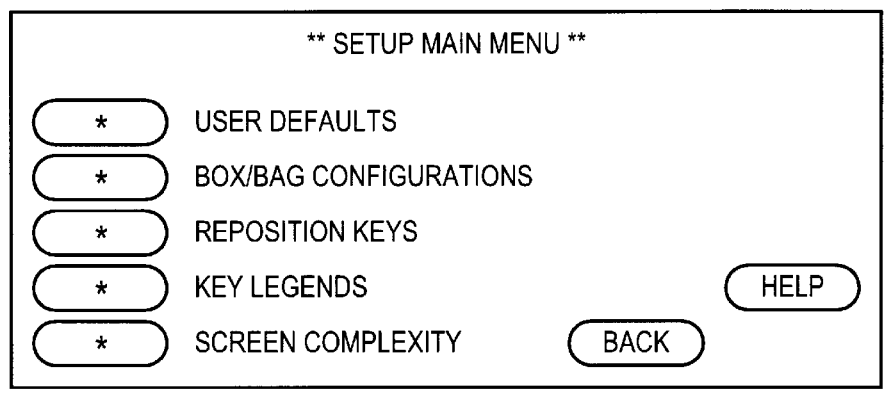

In one embodiment, when the controller 51 of FIG. 3 or FIG. 6 is in the setup mode, the controller 51 causes the display 66 to initially display the primary display pattern (main setup menu) illustrated in FIGS. 8*a*–*b*. The primary display pattern provides, for example, the following setup options: ENABLE KEYS, ENABLE FUNCTIONS, DATA ENTRY SELECTIONS, PORT SETUP, PERIPHERAL FORMATS, USER DEFAULTS, BOX/BAG CONFIGURATIONS, REPOSITION KEYS, KEY LEGENDS, and SCREEN COMPLEXITY. The key legends are located beside their respective keys, as opposed to within their respective keys, because the legends are too lengthy to fit within the keys.

Since the key legends occupy a relatively large portion of the display 66, all of the setup options would not reasonably fit on a single primary display pattern. Therefore, the primary display pattern is divided into two portions which are separately displayed on the display 66 using the MORE and BACK keys. Only one of the two portions is shown on the display 66 at any given time. For example, if FIG. 8*a* represents the portion of the primary display pattern currently on the display 66, pressing the MORE key causes the display 66 to display the portion of the primary display pattern shown in FIG. 8*b*. Similarly, if FIG. 8*b* represents the portion of the primary display pattern currently on the display 66, pressing the BACK key causes the display 66 to display the portion of the primary display pattern shown in FIG. 8*a*.

To modify the current settings of a particular setup option in FIGS. 8*a*–*b*, the operator presses the displayed key of that setup option. Pressing the displayed key causes the controller 51 to display on the display 66 a secondary display pattern (sub-menu). The secondary display pattern includes keys for modifying the current settings of the setup option. The current settings of the setup option are indicated by those keys which are illuminated. To assist the operator in understanding the meaning of the various keys in the secondary display pattern, the secondary display pattern includes a HELP key. When the operator has completed his/her modifications to the current settings of the setup option, the operator returns to the primary display pattern (main setup menu) by pressing an EXIT key.

Figure 9A:
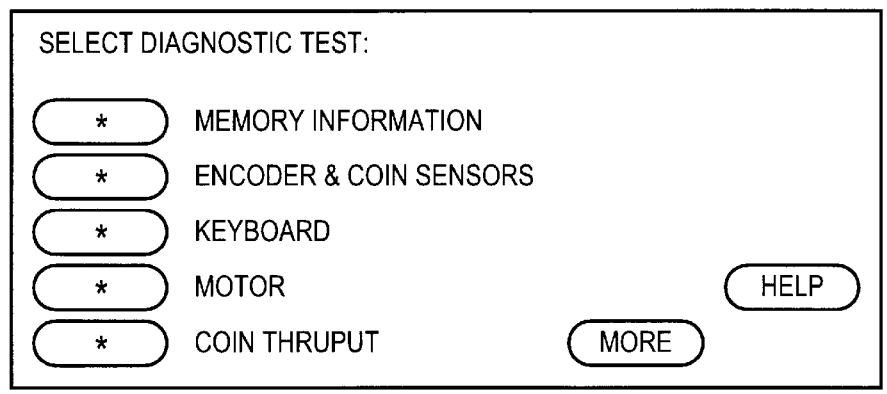
FIGS. 9a–b are diagrammatic representations of the touch screen device of FIG. 7 showing a main diagnostic test menu while the controller in FIG. 3
Figure 9B:
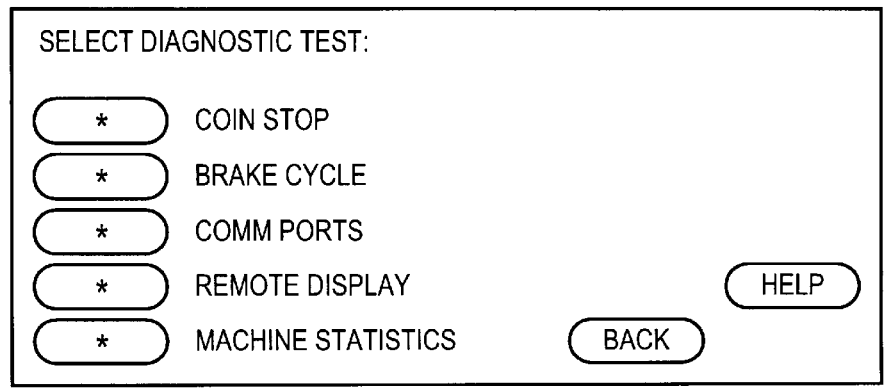

In one embodiment of the present invention, when the controller 51 of FIG. 3 or FIG. 6 is in the diagnostic test mode, the display 66 initially displays the primary display pattern (main setup menu) illustrated in FIGS. 9*a*–*b*. The primary display pattern provides, for example, the following diagnostic test options: MEMORY INFORMATION, ENCODER & COIN SENSORS, KEYBOARD, MOTOR, COIN THRUPUT, COIN STOP, BRAKE CYCLE, REMOTE DISPLAY, and MACHINE STATISTICS. The key legends are located beside their respective keys, as opposed to within their respective keys, because the legends are too lengthy to fit within the keys.

Since the key legends occupy a relatively large portion of the display 66, all of the diagnostic test options would not reasonably fit on a single primary display pattern. Therefore, the primary display pattern is divided into two portions which are separately displayed on the display 66 using the MORE and BACK keys. Only one of the two portions is shown on the display 66 at any given time. For example, if FIG. 9*a* represents the portion of the primary display pattern currently on the display 66, pressing the MORE key causes the display 66 to display the portion of the primary display pattern shown in FIG. 9*b*. Similarly, if FIG. 9*b* represents the portion of the primary display pattern currently on the display 66, pressing the BACK key causes the display 66 to display the portion of the primary display pattern shown in FIG. 9*a*. To select a particular diagnostic test option in FIGS. 9*a*–*b*, the operator presses the displayed key of that diagnostic test option.

Depending upon the selected diagnostic test, the controller 51 (FIG. 3 or FIG. 6) either automatically performs the selected diagnostic test or prompts the operator to enter numerical data (using the numeric keypad) prior to performing the diagnostic test. For example, in response to pressing the displayed key for the KEYBOARD diagnostic test option, the controller 51 causes the display 66 to display a 6×5 matrix of keys without legends. To check whether or not the touch screen 64 is operating correctly, the operator is prompted to press any of the keys on the 6×5 matrix. If the touch screen 64 is working properly, the pressed key should be illuminated while it is touched by the operator. The prompts for data entry and the results of the selected diagnostic test are displayed on the display 66 as secondary display patterns. To assist the operator in performing the diagnostic tests, the secondary display pattern(s) associated with each diagnostic test include a HELP key. When the operator has completed a diagnostic test, the operator returns to the primary display pattern (main setup menu) by pressing an EXIT key.

The setup and diagnostic test modes illustrate the flexibility, versatility, and user friendliness of the touch screen device 56. In particular, the use of lengthy external key legends facilitates comprehension of the function of a particular key. If these external key legends were substituted with abbreviated legends located within their respective keys, the operator may need to consult an instruction manual to understand the function of the keys. The external key legends often obviate the need to consult instruction manuals. Furthermore, although the lengthy external key legends reduce the number of keys which can be displayed at a given time on the display 66, a relatively large number of keys with external key legends can easily be divided into two or more groups and each group can be separately displayed on the display 66 (see, e.g., FIGS. 8*a*–*b* and 9*a*–*b*). In response to pressing a MORE key or a BACK key, the controller 51 controls which group of keys is displayed on the display 66. In conjunction with the touch screen device 56, the controller 51 can create a hierarchy of display patterns for display on the display 66. The display pattern may include display fields with textual information, numerical information, data entry prompts, or keys actuated via the touch screen 64. The touch screen device 56 and controller 51 permit a virtually unlimited number of keys to be displayed on the display 66, the number of keys being constrained primarily by the capacity of the system memory 58 of the controller 51. Movement from one display pattern to the next is achieved by pressing a key, such as a MORE key or a BACK key, displayed on the current display pattern. Such a large number of keys would occupy an inordinate amount of space if formed as part of the mechanical keyboard 57.

The touch screen device 56 provides the operator with several advantageous features which will be described in connection with FIGS. 10–20. One advantageous feature is that the operator can use the touch screen device 56 to label the data entry fields A, B, C, and D with textual information, in addition to or instead of the labels A, B, C, and D, indicating the source of a sorted coin batch. These textual labels are typically more meaningful to the operator than the labels A, B, C, and D and may be incorporated in a printed report for a sorted batch of coins. To provide a data entry field with a textual label, the operator enters the setup mode and presses the key labelled DATA ENTRY SELECTIONS. In response to pressing this key, the controller 51 causes the display 66 to display the following three data entry options: SELECT LABELS, SELECT RECEIPTS, and SELECT OTHER. The operator presses the key associated with SELECT LABELS, which causes the display 66 to display the four data entry fields A, B, C, and D. Each data entry field is accompanied by a CUSTOM key.

Figure 10:
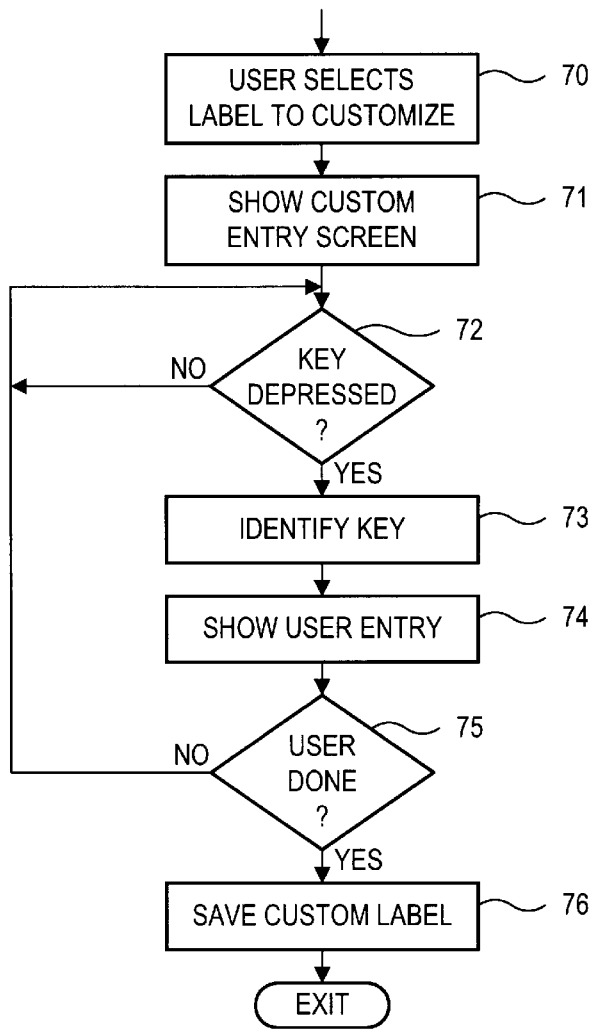
FIG. 10 is a flow diagram showing the operation of providing data entry fields with custom labels in the touch screen device of FIG. 7.

Referring to the flow diagram in FIG. 10, the operator selects a data entry field to customize by pressing the CUSTOM key accompanying the selected data entry field (step 70). In response to pressing the CUSTOM key, the controller 51 causes the display 66 to display a custom entry display pattern including keys for the letters of the alphabet (step 71). The operator then enters a custom label not to exceed a predetermined number of letters and/or numbers (steps 72–75). The operator selects letters using the displayed letter keys and selects numbers using the numeric keypad of the mechanical keyboard 57. The controller 51 determines whether a displayed letter key or a mechanical number key is pressed at step 72. If a key is pressed, the controller 51 identifies the pressed key at step 73 and displays the letter or number associated with the pressed key at step 74. When the operator has completed entry of the custom label, the operator presses the ENTER key on the mechanical keyboard 57 (step 75). Pressing the ENTER key causes the controller 51 to save the custom label (step 76). To return to the main setup menu, the operator presses an EXIT key on the display 61 until the main setup menu is displayed.

Figure 11A:
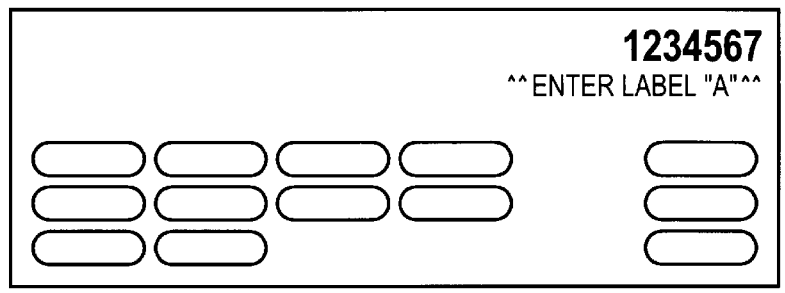
FIGS. 11a–b are diagrammatic representations of the touch screen device of FIG. 7 showing display patterns with and without a custom label.
Figure 11B:
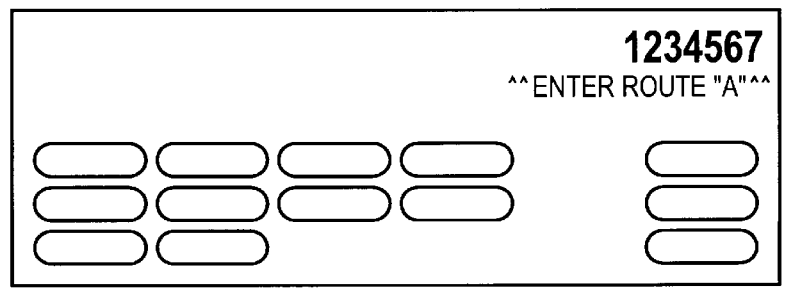

FIGS. 11a–b illustrate exemplary display patterns (without key legends) before the data entry field A is provided with a custom label (FIG. 11a) and after the field A is provided with a custom label (FIG. 11b). Before the field A is labelled with textual information, the field A merely includes a numeric code 1234567 accompanied by the information "label 'A'" (FIG. 11a). After customizing the label for field A, the information "LABEL 'A'" is replaced with more meaningful information such as "ROUTE" (FIG. 11b). With the customized label, the operator knows that the numeric code 1234567 represents a route (e.g., driver number). Thus, the custom label in FIG. 11b provides the operator with meaningful information regarding the source of a coin batch.

In a manner similar to customizing data entry fields, the operator can use the touch screen device 56 to modify (edit) key legends. To modify a key legend, the operator simply enters the setup mode and presses the key labelled KEY LEGENDS. After selecting the key legend to be modified, the controller 51 causes the display 61 to display a custom entry display pattern including keys for the letters of the alphabet. To edit the key legend, the operator selects letters using the displayed letter keys and selects numbers using the numeric keypad of the mechanical keyboard 57. While modifying the key legend, the operator should remember that the function of the key associated with that legend does not change by editing the legend. In other words, the function of the key remains the same regardless of the legend entered for that key. In connection with FIG. 10, the procedure for editing key legends is substantially the same as the procedure for customizing field labels, except that at step 70 the operator selects the key legend to edit and at step 76 the operator saves the edited key legend.

Figure 12A:
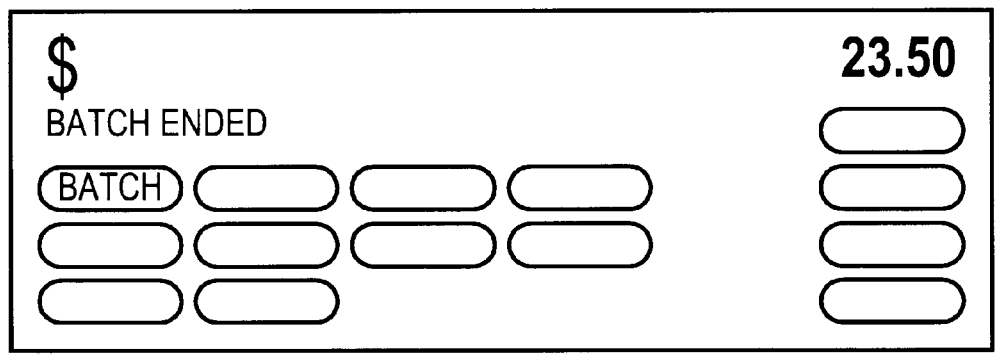
FIGS. 12a–b are diagrammatic representations of the touch screen device of FIG. 7 showing a displayed key with and without a custom key legend.
Figure 12B:
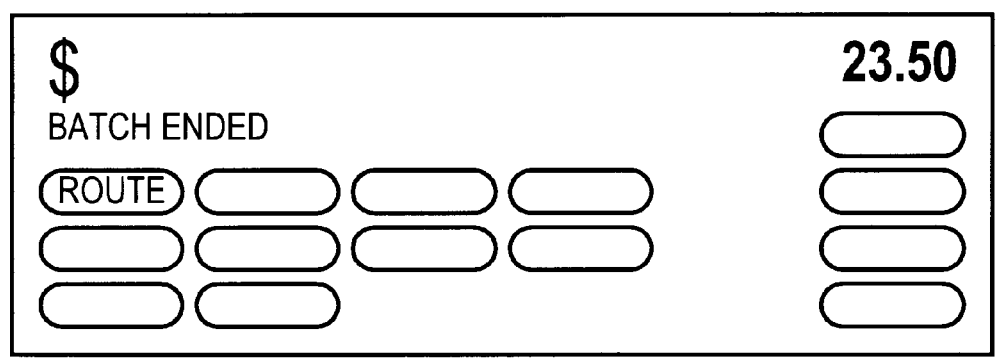

FIGS. 12a–b illustrate exemplary display patterns before the key legend for the BATCH key is modified (FIG. 12a) and after key legend for the BATCH key is modified (FIG. 12b). Before the key legend is modified, the BATCH key includes the legend "BATCH" within the key outline. After modifying the key legend, the BATCH key includes the legend "ROUTE" within the key outline. The key legend "ROUTE" would indicate to the operator that the sorted batch of coins having a value of $23.50 pertain to a "route", as opposed to some other type of coin batch. Thus, like data entry fields with custom labels, the edited key legend provides the operator with meaningful information regarding the type of coin batch.

Another advantageous feature of the touch screen device 56 is that the operator can use the touch screen device 56 to delete (disable) or add (enable) keys displayed on the display 66. For example, an operator (e.g., a vending company) having no use for a particular coin denomination such as pennies can delete all references by the display 66 to that coin denomination. To delete or add a key for display on the display 66, the operator enters the setup mode and presses the key labelled ENABLE KEYS.

Figure 13:
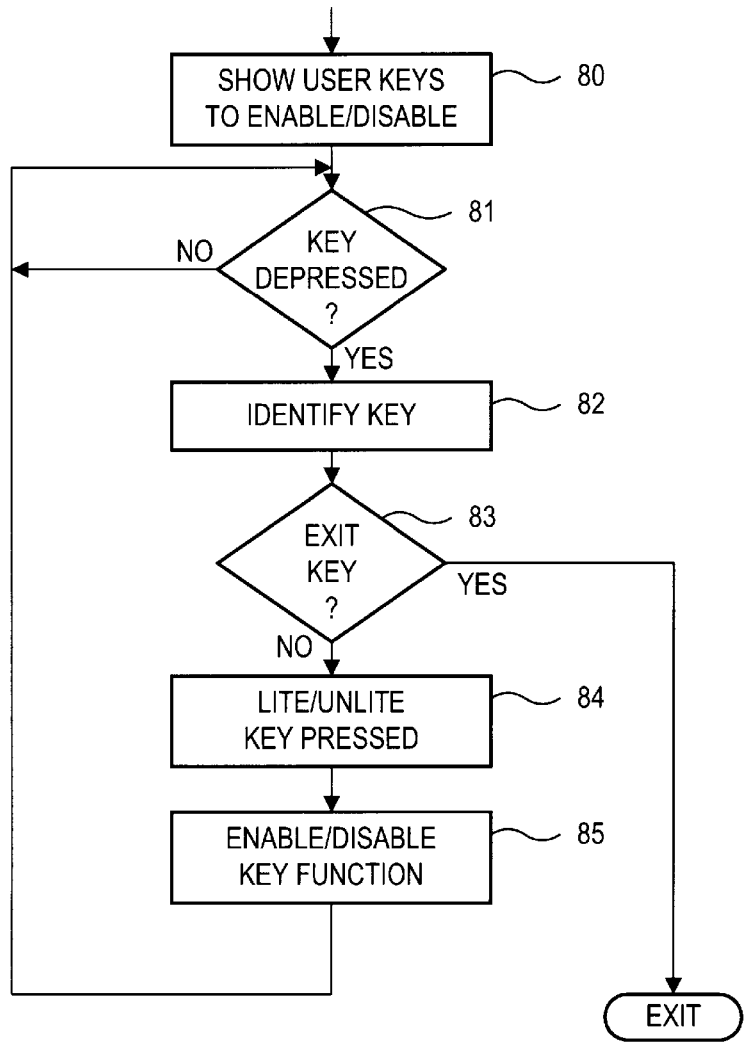
FIG. 13 is a flow diagram showing the operation of enabling and disabling keys in the touch screen device of FIG. 7.

Referring to the flow diagram in FIG. 13, in response to pressing this key, the controller 51 (FIG. 3 or FIG. 6) causes the display 66 to display those keys which may be enabled or disabled (step 80). The current settings of the keys are determined by whether or not they are illuminated. The illuminated keys are enabled while the non-illuminated keys are disabled. After showing the operator the keys which may be enabled or disabled (step 80), the controller 51 determines whether a displayed key is pressed at step 81. If a key is pressed, the controller 51 identifies the pressed key at step 82. If the identified key is not the exit key (step 83), the controller 51 disables the pressed key if it was previously enabled and the controller 51 enables the pressed key if it was previously disabled (steps 84 and 85). If at step 83 the controller 51 identifies the pressed key to be the exit key, the controller 51 exits the ENABLE KEYS setup option and returns to the main setup menu.

Figure 14A:
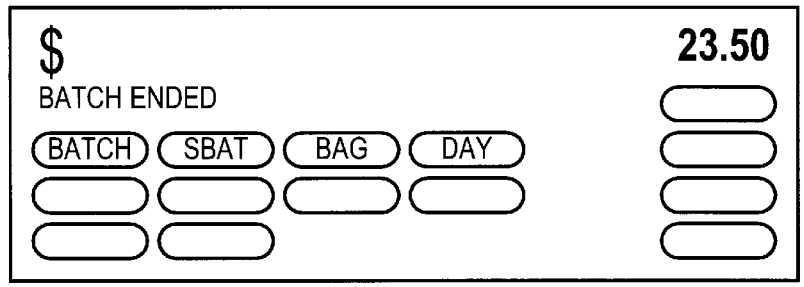
FIGS. 14a–b are diagrammatic representations of the touch screen device of FIG. 7 showing display patterns with and without an SBAT key.
Figure 14B:
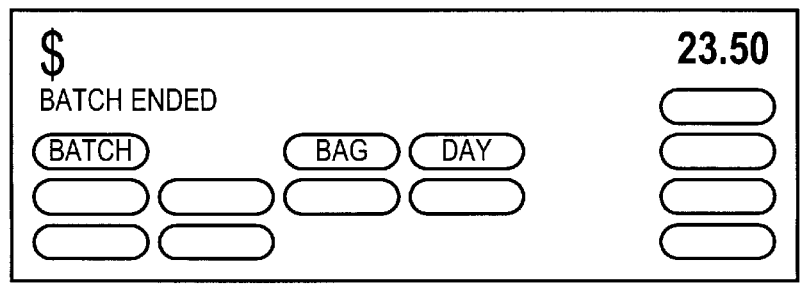

In the operating mode of the controller 51, the controller 51 does not display the disabled keys on the display 66. If, for example, the operator disabled the SBAT key because the operator does not sort sub-batches of coins, the controller 51 does not display the SBAT key. FIGS. 14a–b illustrate exemplary display patterns in the operating mode of the controller 51 before the SBAT key is deleted (FIG. 14a) and after the SBAT key is deleted (FIG. 14b).

Figure 16A:
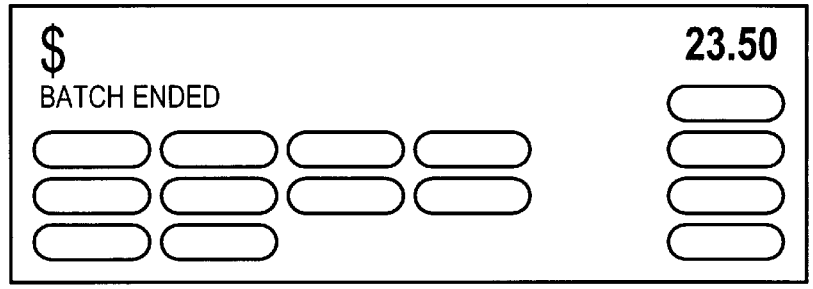
FIGS. 16a–b are diagrammatic representations of the touch screen device of FIG. 7 showing display patterns with and without a PRINT key.
Figure 15:
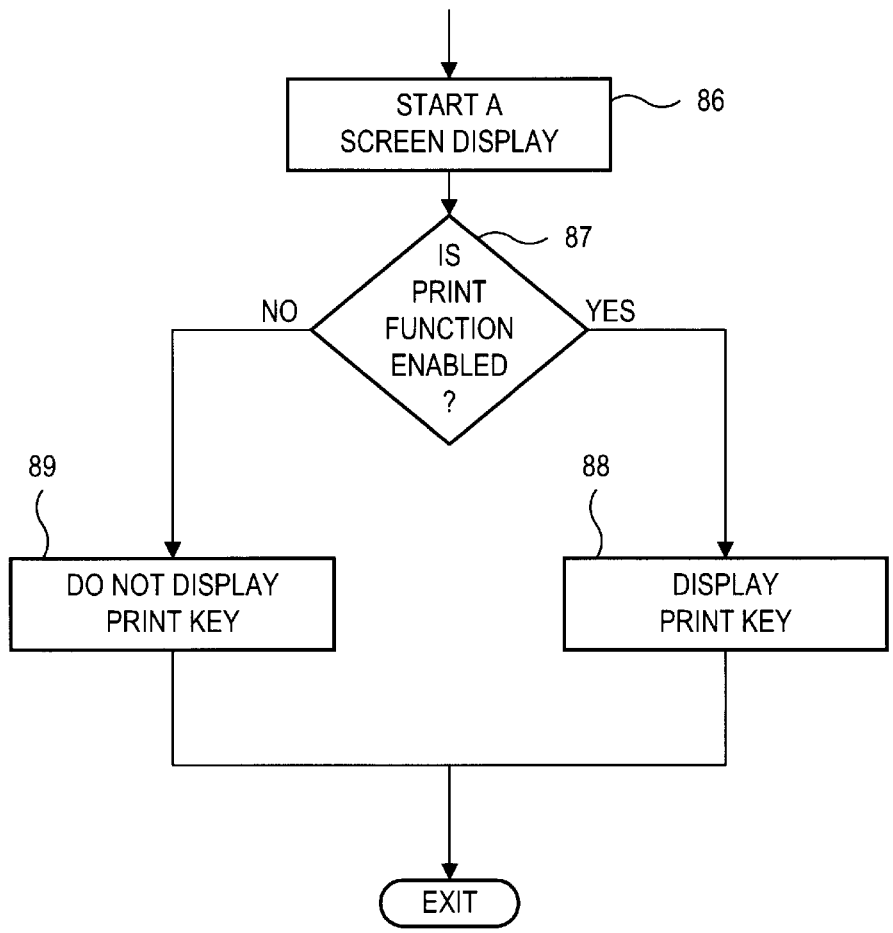
FIG. 15 is a flow diagram showing the operation of enabling and disabling a print key by enabling and disabling the print function in the touch screen device of FIG. 7.
Figure 16B:
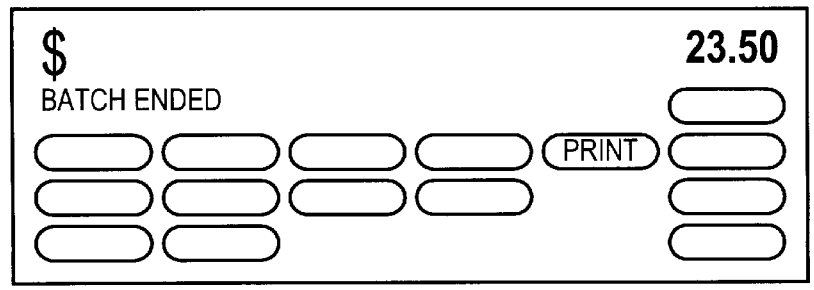

The operator also has the ability to add or delete keys displayed on the display 66 by enabling or disabling the function associated with the keys. This feature is illustrated in FIGS. 15 and 16a–b in connection with the print key. More specifically, to add the print key to the display pattern in FIG. 16a, the operator enters the setup mode and presses the key labelled ENABLE FUNCTIONS.

Referring to the flow diagram in FIG. 15, in response to pressing this key, the controller 51 causes the display 66 to display those functions which may be enabled or disabled (step 86). The status of a particular function is indicated by one or more keys located adjacent a textual description of the function. With respect to the print key, the display 66 displays, for example, the word "printer" followed by an OFF key and an ON key. The status of the print key is indicated by which of the two keys is illuminated. If the OFF key is illuminated, the controller 51 does not display the print key in its operating mode (steps 87 and 89).

FIG. 16*a* illustrates an exemplary display pattern with the print key disabled. If the ON key is illuminated, the controller 51 displays the print key in its operating mode (steps 87 and 88). FIG. 16*b* illustrates an exemplary display pattern with the print key enabled. The operator may change the status of the print key simply by pressing the OFF key when the ON key is illuminated or by pressing the ON key when the OFF key is illuminated. To return to the main setup menu, the operator presses an EXIT key.

In a manner similar to disabling and enabling keys, the touch screen device 56 may be used to reposition keys displayed on the display 66 in accordance with the preferences of the operator. For example, an operator which repeatedly uses the BATCH key may wish to position the key on the display 66 at a location which facilitates his/her operation of that key. To reposition a key displayed on the display 66, the operator enters the setup mode and presses the key labelled REPOSITION KEYS. In response to pressing this key, the controller 51 causes the display 66 to display those keys which may be repositioned.

Figure 17:
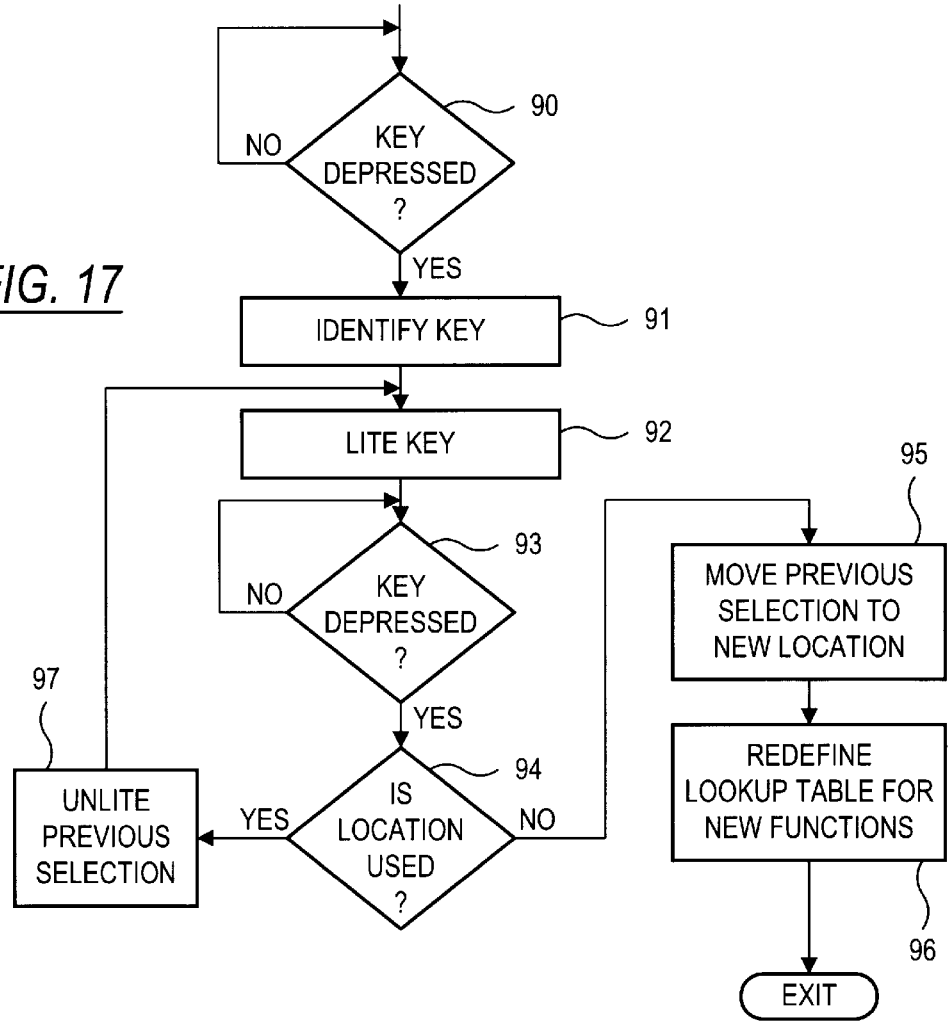
FIG. 17 is a flow diagram showing the operation of repositioning a key displayed on the touch screen device of FIG. 7.

Referring to the flow diagram in FIG. 17, after showing the operator the keys which may be repositioned, the operator first presses a displayed key ("first key") which he/she would like to reposition. The controller 51 determines whether the first key is pressed at step 90. If the first key is pressed, the controller 51 identifies and illuminates the pressed first key (steps 91 and 92). Next, the operator presses a second key located where the operator would like to reposition the first key. The controller 51 determines whether this second key is pressed at step 93. In order to reposition the first key to the location of the second key, the location of the second key must be unused. That is, another function must not already accompany this second key. The controller 51 determines whether the second key is used at step 94. If the second key is unused, the controller 51 repositions the first key to the location of this second key (step 95) and defines the function of this second key to correspond to that of the first key (step 96). If at step 94 the location of the second key is already used, the controller 51 unlights the first key (step 97) and illuminates the second key (step 92). The controller 51 has, in essence, determined that the operator intended to reposition the second key, not the first key, so that the controller 51 waits for the operator to press a third key located where the operator would like to reposition the second key (step 93). As long as this third key is unused (step 94), the controller 51 will move the second key to the location of the third key (step 95) and define the function of the third key to correspond to that of the second key (step 96). The operator returns to the main setup menu by pressing an EXIT key on the display 66.

In an alternative embodiment, if the operator attempts to reposition a first key to a used second key location, the controller 51 interchanges the first and second keys and their associated functions.

In the operating mode of the controller 51, the controller 51 displays the keys on the display 66 in accordance with any new positions assigned to the keys in the setup mode.

Figure 18A:
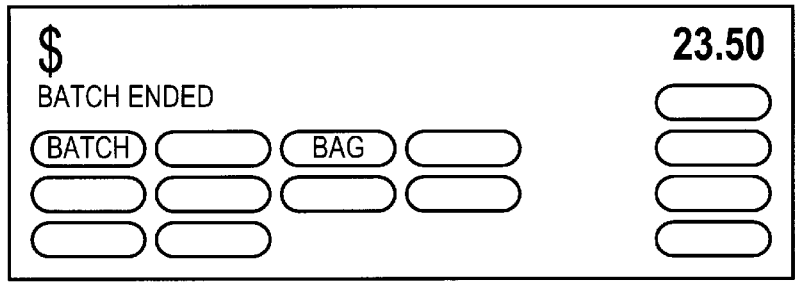
FIGS. 18a–b are diagrammatic representations of the touch screen device of FIG. 7 showing display patterns with a BATCH key and BAG key in two different positions.
Figure 18B:
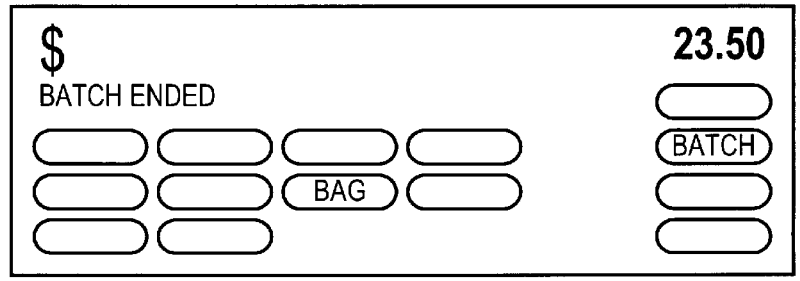

FIGS. 18*a–b* illustrate exemplary display patterns in the operating mode of the controller 51 before the BATCH key and BAG key are repositioned (FIG. 18*a*) and after these two keys are repositioned (FIG. 18*b*). It should be understood that the controller 51 redefines a look-up table in memory so that the function of a key remains with the key when it is repositioned. In particular, when the key is repositioned from a first location to a second location, the controller 51 redefines the look-up table so that the switch above the second location is now operably connected to the function of the repositioned key and the switch above the first location is no longer operably connected to the function of the repositioned key.

Yet another advantageous feature of the touch screen device 56 is that the operator can modify the complexity of the display pattern on the display 66 to match the level of experience of the operator. For example, a novice may prefer a large number of relatively simple display patterns while a more experienced operator may prefer a small number of relatively complex display patterns.

Figure 19:
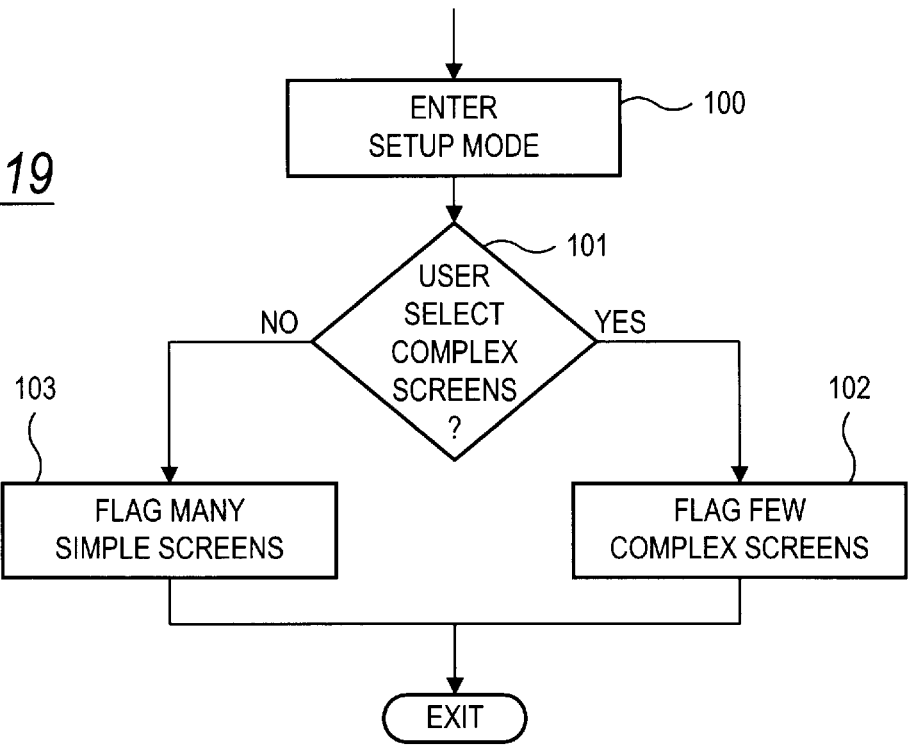
FIG. 19 is a flow diagram showing the operation of selecting the complexity of the display pattern displayed on the touch screen device of FIG. 7.

Referring to the flow diagram in FIG. 19, to modify the complexity of the display pattern displayed on the display 66, the operator enters the setup mode and presses the key labelled SCREEN COMPLEXITY (step 100). In response to pressing this key, the controller 51 gives the operator the option of selecting complex display patterns (step 101). If the operator selects complex display patterns, the controller 51 will provide a relatively small number of complex display patterns in its operating mode (step 102). If the operator does not select complex display patterns, the controller 51 will provide a relatively large number of simple display patterns in its operating mode (step 103). To return to the main setup menu, the operator presses an EXIT key on the display 61.

Figure 20B:
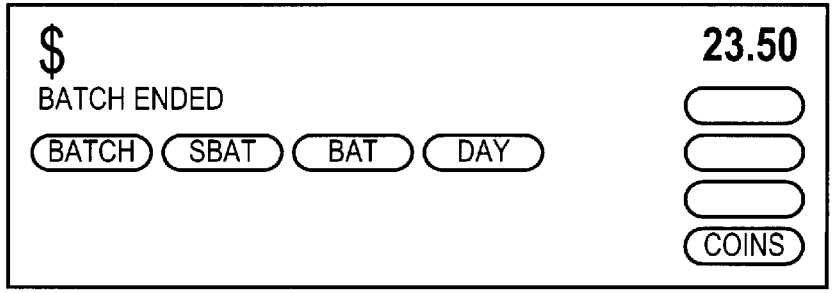

In the operating mode of the controller 51, the complexity of the display patterns on the display 66 corresponds to the selection made by the operator in the SCREEN COMPLEXITY setup option. FIGS. 20*a–b* illustrate exemplary complex and simple display patterns. Both display patterns include the BATCH key, SBAT key, BAG key, and DAY key. Only the complex display pattern (FIG. 20*a*), however, includes the coin denomination keys for pennies, nickels, dimes, quarters, half dollars, and dollars. If the operator selects simple display patterns in the setup mode, these coin denomination keys are provided on a secondary display pattern in the operating mode of the controller 51. The controller 51 displays these coin denomination keys on the display 66 in response to pressing the COINS key in FIG. 20*b*.

According to a preferred embodiment of the present invention, the control software associated with the customized displays described in relation to FIGS. 10 through 20 may be quickly and efficiently copied onto a flash card and thereafter copied onto other machines, in the manner described in relation to FIG. 5. By "cloning" the control software in this manner, an operator may repeatedly obtain a desired customization (e.g., customized labels, customized key legends, addition or deletion of keys, repositioning of keys, and/or customized screen complexity) of a particular touch screen device 56 or of several different touch screen devices 56 without the need to re-enter several keystrokes. This may be accomplished by initially programming a first coin sorting machine with the desired parameters, then simply plugging a flash card into the first coin sorting machine, causing the desired parameters to be copied from the flash memory of the first coin sorting machine to the flash card. The flash card may then be retained by the operator until it is needed to identically program other coin sorting machines or to re-program the first machine, at which time the operator simply plugs in the flash card into the coin sorting machine to be programmed.

The following example illustrates some of the advantages of the flash card loading system used in conjunction with coin sorting machines. Suppose, for example, that a customer possesses one coin sorting machine and employs several operators for operating the coin sorting machine. Suppose further that each of the several operators desires a unique screen layout due to the unique tastes and/or experience level of the respective individuals. In such a scenario, the touch screen layout must typically be frequently re-programmed to satisfy each individual operator. In prior art systems, such reprogramming may be accomplished by the respective operators each entering up to several keystrokes at the operator interface panel, as described in detail in relation to FIGS. 10 through 20. With a flash card loading system according to principles of the present invention, such re-programming may be accomplished by the respective operators simply plugging flash cards with the desired touch screen layouts into the coin sorting machine before operating the device.

It will be appreciated that principles of the present invention may be used with types of coin sorting systems other than the disc-type sorter illustrated in FIGS. 1 and 2 such as, for example, a disc-to-disc type coin sorter, a rail-type coin sorter with exit channels, and a modified rail-type coin sorter with exit apertures. Each of these types of coin sorters uses a coin-driving member having a resilient surface for moving coins along a metal coin-guiding surface of a stationary coin-guiding member. In the disc-to-disc type coin sorter, the coin-driving members include a pair of rotating discs and the coin-guiding members include a stationary queuing head and a stationary sorting disc. The disc-to-disc type coin sorter is described in further detail in U.S. application Ser. No. 08/178,658 entitled "Coin Queuing and Sorting Arrangement", filed Jan. 7, 1994, now U.S. Pat. No. 5,425,669 and incorporated herein by reference in its entirety. In the rail-type coin sorter, the coin-driving member is a drive belt and the coin-guiding member is a stationary sorting rail. The sorting rail either includes exit channels or apertures. The rail-type coin sorter is described in further detail in U.S. application Ser. No. 08/037,269 entitled "Coin Queuing Device and Power Rail Sorter", filed March 26, 1993, now U.S. Pat. No. 5,382,191 and incorporated herein by reference in its entirety.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A coin sorting system, comprising:
   a coin sorter for sorting a plurality of coins;
   a system controller coupled to the coin sorter;
   an operator interface panel coupled to the system controller, said operator interface panel including a touch screen display for displaying keys associated with operation of the coin sorting system;
   a resident memory coupled to the system controller and containing a first version of control software to be executed by the system controller, said first version of control software including a first display setting of the touch screen display; and
   a flash card having a flash card memory containing a second version of control software to be executed by the system controller, said second version of control software including a second display setting of the touch screen display, said flash card being adapted to be removably electrically coupled to the coin sorter, said resident memory being adapted to erase the first version of control software and store the second version of control software in response to the flash card being electrically coupled to the coin sorter, said resident memory being adapted to retain the second version of control software in response to the flash card being thereafter removed from the coin sorter.

2. The coin sorting system of claim 1 wherein said resident memory comprises a flash memory.

3. The coin sorting system of claim 2 wherein said flash card memory comprises a flash memory.

4. The coin sorting system of claim 1 wherein said resident memory is housed within a ZIF socket.

5. The coin sorting system of claim 1 wherein said flash card is adapted to be electrically coupled and removed from a plurality of additional machines to accomplish a number of additional software changes, said flash card memory including a counter for limiting the number of additional software changes said flash card may accomplish.

6. A coin sorting system, comprising:
   a coin sorter for sorting a plurality of coins, the coin sorter including a coin-guiding surface forming a plurality of exit stations for selectively allowing exiting of the coins based upon their respective diameters, the coin sorter further including a plurality of discrimination sensors for discriminating among desired and undesired coins in said exit stations;
   a system controller coupled to the coin sorter;
   a resident flash memory coupled to the system controller and containing a first version of control software to be executed by the system controller, said first version of control software including characteristic data associated with a first set of coins to be accommodated by said coin sorter; and
   a flash card having a flash card memory containing a second version of control software to be executed by the system controller, said second version of control software including characteristic data associated with a second set of coins to be accommodated by said coin sorter, said flash card being adapted to be removably electrically coupled to the coin sorter, said resident memory being adapted to erase the first version of control software and store the second version of control software in response to the flash card being electrically coupled to the coin sorter, said resident memory being adapted to retain the second version of control software in response to the flash card being thereafter removed from the coin sorter;
   wherein said coin sorting system includes a touch screen display for displaying keys associated with operation of the coin sorting system, said first version of control software including a first display setting of the touch screen display and said second version of control software including a second display setting of the touch screen display.

7. A method of loading software changes into a coin sorting system including a system controller for executing control software associated with the coin sorting system, said system controller being electrically coupled to a resident memory containing a first version of control software to be executed by said system controller, said method of loading software upgrades comprising the steps of:

storing a second version of control software in a flash card memory contained within a flash card remote from said coin sorting system;

electrically coupling said flash card to the coin sorting system to cause said resident memory to erase the first version of control software and store the second version of control software; and removing said flash card from the coin sorting system, said resident memory of said coin sorting system thereafter retaining the second version of control software;

wherein said coin sorting system includes a touch screen display for displaying keys associated with operation of the coin sorting system, and further including displaying a first display setting on the touch screen display in response to said first version of control software and displaying a second display setting of the touch screen in response to said second version of control software.

8. A software loading system for a coin sorting system having a system controller for executing control software associated with the coin sorting system, said software loading system comprising:

a resident memory containing a first version of control software to be executed by the system controller; and a flash card having a flash card memory containing a second version of control software, said flash card being adapted to be removably electrically coupled to the coin sorting system, said system controller being adapted to execute said second version of control software in response to the flash card being electrically coupled to the coin sorting system, said system controller being adapted to execute said first version of control software in response to the flash card being thereafter removed from the coin sorting system;

wherein said coin sorting system includes a touch screen display for displaying keys associated with operation of the coin sorting system, said first version of control software including a first display setting of the touch screen display and said second version of control software including a second display setting of the touch screen display.

9. The software loading system of claim 8 wherein said flash card memory comprises a flash memory.

10. A method of loading software changes in a coin sorting machine having a system controller for executing control software associated with the coin sorting machine, said system controller being electrically coupled to a resident memory containing a first version of control software to be executed by said system controller, said method of loading software changes comprising the steps of:

storing a second version of control software in a flash card memory contained within a flash card remote from said coin sorting machine; and electrically coupling said flash card to the coin sorting machine to cause said system controller to execute said second version of control software;

wherein said coin sorting machine includes a touch screen display for displaying keys associated with operation of the coin sorting machine, and further including displaying a first display setting on the touch screen display in response to said first version of control software and displaying a second display setting of the touch screen in response to said second version of control software.

11. The method of claim 10 wherein the step of storing the second version of control software in the flash card memory of said flash card comprises the step of electrically coupling said flash card to a first coin sorting machine having a resident memory containing said second version of control software, said second version of control software being copied from said resident memory of said first coin sorting machine to said flash card memory in response to said flash card being electrically coupled to said first coin sorting machine.

12. A coin sorting machine, comprising:

a coin sorter for sorting a plurality of coins, the coin sorter including a coin-guiding surface forming a plurality of exit stations for selectively allowing exiting of the coins based upon their respective diameters;

a system controller coupled to the coin sorter;

an operator interface panel coupled to the system controller, said operator interface panel including a touch screen display for displaying keys associated with operation of the coin sorting system;

a resident flash memory coupled to the system controller and containing control software to be executed by the system controller, said control software including a customized setting of the touch screen display;

a flash card having a flash card memory; and a socket adapted to removably receive said flash card therein, said socket being electrically coupled to said resident flash memory of said coin sorting machine, wherein said control software is copied from said resident flash memory to said flash card memory in response to said flash card being inserted into said socket, said flash card thereafter being adapted to be removed from said socket and electrically coupled to a plurality of secondary coin sorting machines, said customized settings of the touch screen display being copied from said flash card memory to the resident flash memorys of the secondary coin sorting machines in response to the flash card being electrically coupled to the plurality of secondary coin sorting machines.

* * * * *